United States Patent
Barrett et al.

(10) Patent No.: US 10,617,142 B2
(45) Date of Patent: Apr. 14, 2020

(54) SWEETENED FOOD PRODUCT AND METHOD OF PREPARATION

(71) Applicant: General Mills, Inc., Minneapolis, MN (US)

(72) Inventors: Christopher J. Barrett, Plymouth, MN (US); Douglas L. Goedeken, Blaine, MN (US); Daniel R. Green, Minnetonka, MN (US); Victor T. Huang, Maple Grove, MN (US); Lauren A. Jacobson, Bloomington, MN (US); Christine M. Nowakowski, Plymouth, MN (US); Scott K. Whitman, New Hope, MN (US); Danielle M. Wojdyla Christensen, Minneapolis, MN (US)

(73) Assignee: General Mills, Inc., Minneapolis, MN (US)

( * ) Notice: Subject to any disclaimer, the term of this patent is extended or adjusted under 35 U.S.C. 154(b) by 883 days.

(21) Appl. No.: 14/752,277

(22) Filed: Jun. 26, 2015

(65) Prior Publication Data

US 2015/0289555 A1 Oct. 15, 2015

Related U.S. Application Data

(62) Division of application No. 13/624,002, filed on Sep. 21, 2012.

(Continued)

(51) Int. Cl.
*A23P 20/10* (2016.01)
*A23G 3/34* (2006.01)
*A23L 7/122* (2016.01)

(52) U.S. Cl.
CPC ............ *A23P 20/10* (2016.08); *A23G 3/0065* (2013.01); *A23G 3/0089* (2013.01); *A23G 3/343* (2013.01); *A23L 7/122* (2016.08)

(58) Field of Classification Search
CPC ....... A23L 7/122; A23P 20/10; A23G 3/0065; A23G 3/0089; A23G 3/343
See application file for complete search history.

(56) References Cited

U.S. PATENT DOCUMENTS

| 2,788,277 A | 4/1957 | Huber |
| D202,609 S | 10/1965 | Weiss |

(Continued)

FOREIGN PATENT DOCUMENTS

| CA | 1168919 | 6/1984 |
| GB | 2012722 | 8/1990 |

(Continued)

OTHER PUBLICATIONS

Saleka-Gerhardt et al., "Non-Isothermal and Isothermal Crystallization of Sucrose from the Amorphous State", Pharmaceutical Research, Cover Date: Aug 1, 1994, Publisher: Springer Netherlands, Issn. 0724-8741, pp. 1166-1173, vol. 11, Iss. 8.

(Continued)

*Primary Examiner* — Katherine D Leblanc
(74) *Attorney, Agent, or Firm* — Diederiks & Whitelaw, PLC; Gregory P. Kaihoi, Esq.

(57) ABSTRACT

Described are coated food products having a sugar (sucrose) coating, the coating exhibiting desirable levels of sucrose crystallinity and a desired sucrose ratio (total sucrose per total soluble solids), as well as methods or preparing such coated food products and coating.

12 Claims, 6 Drawing Sheets

Related U.S. Application Data

(60) Provisional application No. 61/537,354, filed on Sep. 21, 2011, provisional application No. 61/537,375, filed on Sep. 21, 2011.

(56) References Cited

U.S. PATENT DOCUMENTS

| | | |
|---|---|---|
| 3,246,990 A | 4/1966 | Thompson et al. |
| 3,464,827 A | 9/1969 | Tsuchiya et al. |
| 3,600,193 A | 8/1971 | Glabe et al. |
| 3,687,687 A | 8/1972 | Liepa |
| 3,814,822 A | 6/1974 | Henthorn et al. |
| 3,840,685 A | 10/1974 | Lyall et al. |
| 4,089,984 A | 5/1978 | Gilbertson |
| 4,101,680 A | 7/1978 | Edwards |
| 4,338,339 A | 7/1982 | Edwards |
| 4,379,171 A | 4/1983 | Furda et al. |
| 4,755,390 A | 7/1988 | Calandro et al. |
| 4,859,477 A | 8/1989 | Augustine et al. |
| D339,443 S | 9/1993 | Bielinski et al. |
| D339,444 S | 9/1993 | Evenson et al. |
| D341,469 S | 11/1993 | Evenson et al. |
| 5,318,794 A | 6/1994 | Richards |
| 5,342,188 A | 8/1994 | Zimmermann |
| 5,372,826 A | 12/1994 | Holtz et al. |
| 5,424,085 A | 6/1995 | Hsieh et al. |
| D368,791 S | 4/1996 | Laughlin |
| 5,516,541 A | 5/1996 | Breslin et al. |
| D372,352 S | 8/1996 | Laughlin |
| D373,671 S | 9/1996 | Laughlin et al. |
| D384,785 S | 10/1997 | Laughlin |
| D403,485 S | 1/1999 | Clanton et al. |
| 6,143,342 A | 11/2000 | Weinstein et al. |
| 6,149,965 A | 11/2000 | Van Lengerich et al. |
| 6,174,553 B1 * | 1/2001 | Cerda ............ A23P 20/10 118/13 |
| 6,495,179 B1 | 12/2002 | Zietlow et al. |
| 6,746,707 B2 | 6/2004 | Krysiak et al. |
| 6,793,953 B2 | 9/2004 | Zietlow et al. |
| 8,394,437 B2 | 3/2013 | Lykomitros et al. |
| 2004/0197446 A1 | 10/2004 | Haynes et al. |
| 2005/0255218 A1 | 11/2005 | Green et al. |
| 2005/0266142 A1 | 12/2005 | Green et al. |
| 2006/0257549 A1 | 11/2006 | Overly, III et al. |
| 2006/0286223 A1 | 12/2006 | Long et al. |
| 2007/0237860 A1 | 11/2007 | Abu-Ali et al. |
| 2008/0317919 A1 | 12/2008 | Long et al. |
| 2010/0173051 A1 | 7/2010 | Froseth et al. |
| 2010/0183772 A1 | 7/2010 | Clanton et al. |
| 2011/0183046 A1 | 7/2011 | Nack et al. |
| 2014/0154362 A1 | 6/2014 | Arora et al. |

FOREIGN PATENT DOCUMENTS

| | | |
|---|---|---|
| WO | WO 2000/056173 | 9/2000 |
| WO | 2005/051094 | 6/2005 |
| WO | WO 2009/106218 | 9/2009 |

OTHER PUBLICATIONS

Fast et al., "*Breakfast Cereals and How They are Made*", Minnesota, AACC, pp. 195-220, Jan. 1, 1990.

Saleka-Gerhardt, et al., "Non-Isothermal and Isothermal Crystallization of Sucrose from the Amorphous State" Pharmaceutical Research, Cover Date Aug. 1, 1194, Publisher: Springer Netherlands, Issn: 0724-8741, pp. 1166-1173, vol. 11, Iss. 8.

Anonymous, "ROMP-Isomeratzucker" Rompp, Jan. 1, 2015, XP055190750, URL: https://roempp.thieme.de/roempp4.0/do/data/Rd-09-01623.

* cited by examiner

SWEETENED FOOD PRODUCT AND METHOD OF PREPARATION

CROSS REFERENCE TO RELATED APPLICATION

This application is a divisional of U.S. application Ser. No. 13/624,002, filed Sep. 21, 2012, and titled "SWEETENED FOOD PRODUCT AND METHODS OF PREPARATION", which claims the benefit under 35 U.S.C. § 119(e) of U.S. Provisional Patent Application No. 61/537,354, filed Sep. 21, 2011, and titled "REDUCED SUCROSE PRE-SWEETENED BREAKFAST CEREAL AND METHOD OF PREPARATION," and U.S. Provisional Application No. 61/537,375, filed Sep. 21, 2011, and titled "METHODS FOR MAINTAINING PLANT PRODUCTION CAPACITY AND REDUCING CLUMPING OF CEREALS," the entireties of each being incorporated herein by reference.

FIELD OF THE INVENTION

The present description is directed to food products and to methods of preparing food products. Particular embodiments are directed to sugar coatings for pre-sweetened breakfast cereal products, pre-sweetened breakfast cereal products, other coated sweetened food products, and related methods. In various embodiments the sugar coating and the cereal product can include a relatively reduced amount of sugar.

BACKGROUND

Ready-to-eat ("R-T-E" or "RTE") breakfast cereals are popular packaged food items. R-T-E cereals exist in a large number of different varieties and can be grouped into different categories including puffed and unpuffed cereals, cereals based on particular types of grains, pre-sweetened cereals, and non-pre-sweetened cereals. RTE cereal are often described in terms of shapes such as flakes, shreds, biscuits, squares, puffs, granola cereals, etc. RTE cereals are often described in terms of the principle cereal ingredient from which they are prepared, e.g., wheat, rice, corn, oats, or other major cereal grains. Other categorizations include puffed or unpuffed; whole grain or not; made from whole kernel pieces or from cooked cereal doughs; organic or not; pre-sweetened or not; etc.

The present description is directed toward sugar-coated food products, and is particularly directed toward pre-sweetened RTE cereals of various shapes, compositions, etc. Often, pre-sweetened cereal products include a coating (sugar coating) usually including a nutritive carbohydrate sweetener such as sucrose, corn syrup or another sugar syrup, fructose, etc. Conventionally, pre-sweetened breakfast cereals have been prepared by first producing unsweetened cereal pieces; coating the cereal pieces with an aqueous slurry (or solution or syrups) of sweeteners; and then drying the coated pieces in an oven or air current to remove the moisture added by the syrup application.

Pre-sweetener coatings (i.e., "sugar coatings") typically contain sucrose as the principal ingredient. However, because corn syrup and other non-sucrose sugar syrups are often (depending, for example, upon commodity pricing) less expensive than sucrose, packaged food manufacturers of pre-sweetened cereal products replace or substitute at least a portion of the relatively more expensive sucrose with a less expensive sweetening carbohydrate or sugar such as corn syrup or corn syrup solids, or another carbohydrate such as a soluble fiber. While advantageous from a cost standpoint, reducing the amount of sucrose in a coating to reduce cost can result in a trade-off in terms of other properties of the coating or coated food product. As the amount of sucrose in a sugar coating decreases and the level of a non-sucrose substitute such as corn syrup increases, the sugar coating becomes less crystalline, more sticky, and more hygroscopic.

Stickiness is undesirable in commercial breakfast cereal production. Sticky products can be difficult to handle in commercial plant operations. Excessively sticky cereal pieces can tend to stick together during processing and upon packaging. Great efforts are made to separate instances of two or more cereal pieces stuck together. Also, cereal pieces with lower relative amounts of sucrose and higher relative amounts of non-sucrose sugars are more hygroscopic and can tend to suffer from undesirable moisture absorption over time, especially after opening a cereal bag, leading to an undesirably sticky product after opening. Consequently, the amount of corn syrup or other non-sucrose sugar syrup typically used as a substitute for sucrose in a sugar coating of a pre-sweetened cereal has generally been limited to about one part by weight sugar syrup in five parts by weight sugar coating. That is, previous sugar coatings generally contain at least about 80 weight percent sucrose (dry weight), or more, with 20 weight percent or less corn syrup or other non-sucrose soluble solids.

Current consumer trends favor "reduced sugar" cereal products, which for practical purposes can often mean cereal products having a relatively reduced amount of sucrose. Cereal products that contain a relatively lower amount of sugar can be prepared, in one simple technique, by reducing the amount of sugar coating applied to the cereal base. Typically in a pre-sweetened breakfast cereal the weight ratio of sugar coating to base is about 1:1. Low coverage RTE cereal products have also been described, e.g., having as low as one part sugar coating to 10 parts cereal base. A reduction in the amount of sugar coating, however, comes at the expense of other desirable cereal product attributes. For example, as the amount of sugar coating is reduced, sweetness perception is reduced. Also, the bowl life of a cereal product in cold milk can be unacceptably reduced. The eating quality or texture of the product can be affected and can exhibit less crunch or "bite" than high sucrose pre-sweetened products.

Another approach to reducing the sucrose level of a pre-sweetened RTE cereal product is to add a reduced calorie bulking agent such as polydextrose or sugar alcohols to the sugar coating. While useful, polydextrose and sugar alcohols are several times more expensive than sucrose and some materials can have an undesirable laxative effect especially in more sensitive individuals such as children. There is ongoing interest in the breakfast cereal industry in reducing the sugar (typically sucrose) content of pre-sweetened breakfast cereals, while maintaining the benefits and eating qualities of conventional high sucrose level cereal products. Pre-sweetened cereal products with reduced levels of sugar would desirably exhibit efficient processing, desired texture, flavor (sweetness), bowl life, and other eating qualities, and visual appearance, at least comparable to previous pre-sweetened cereal products containing standard or reduced levels of sucrose.

SUMMARY

Embodiments of methods and food cereal products as described herein include sugar coated food products.

Examples include but are not limited to pre-sweetened RTE cereals having a cereal base and a sugar coating on the base, the sugar coating including sucrose in the form of crystal particles.

For various reasons, food products may desirably include a reduced total amount of sugar, e.g., sucrose. In cereal products, this can mean reduced sucrose in a sugar coating of a pre-sweetened ready-to-eat breakfast cereal. One reason is to include a reduced level of total sucrose in the food product, such as is the case with a reduced or low sugar ready-to-eat cereal. Also, sucrose can be an expensive ingredient compared to some suitable alternative sweeteners. Replacing sucrose with an amount of non-sucrose sweetener, such as a mono-, di-, or poly-saccharide-based syrup sugar (corn syrup, high fructose corn syrup, honey, molasses, etc.) or an artificial sweetener can be desired because those non-sucrose sugars or artificial sweeteners may be less expensive than using sucrose. There is a desire, generally, to use relatively higher amounts of non-sucrose sweeteners (e.g., sugar syrups) or artificial sweeteners to allow the use of a reduced amount of sucrose, replacing the higher cost sucrose ingredient with a relatively lower cost syrup sugar or artificial sweetener ingredient.

But replacing sucrose with a non-sucrose sweetener or other non-sucrose soluble solids (e.g., non-sweetening polysaccharide, soluble fiber) in a sugar coating can diminish desirable product traits. Many non-sucrose sweetener ingredients such as sugar syrups (e.g., corn syrup or corn syrup solids, glucose syrup, honey, molasses, and the like) are known to exhibit relatively higher hygroscopicity compared to crystalline sucrose. Crystalline sucrose exhibits good moisture resistance and relatively low hygroscopicity, so replacing even a portion of crystalline sucrose with a relatively more hygroscopic (amorphous, non-crystalline) sugar syrup can result in increased stickiness and clumping together of coated food pieces. Overall, replacing sucrose with non-sucrose soluble solids such as non-sucrose sweetener, soluble fiber, or other soluble non-sweetening polysaccharides, might be effective to provide desired sucrose reduction. But a reduced amount of crystalline sucrose and an increased level of non-sucrose soluble solids can also result in detrimental effects to non-taste product traits.

Another effect of using relatively higher amounts of non-sucrose soluble solids and a relatively lower amount of sucrose, i.e., a reduce sucrose ratio, in a sugar coating, can be to inhibit crystallization of the reduced amount of sucrose that is still included. Certain non-sucrose soluble solids in a coating material can act to inhibit crystallization of sucrose and may thereby reduce the total amount and the relative amount of crystalline sucrose in the dried sugar coating. In this manner, non-sucrose soluble solids, especially non-sucrose sweetener and polysaccharide ingredients such as syrup sugar ingredients, can be known to function as sucrose crystallization "inhibitors."

Previous to the presently described work, examples of sugar coated cereals have been produced to include sucrose with high crystallinity, but only by use of a limited range of coating formulations having high sucrose levels. These example coatings often have been prepared from coating materials that include very high levels of sucrose, exclusively sucrose, or sucrose with just a small amount of non-sucrose soluble solids, i.e., coatings characterized by a sucrose ratio of greater than 0.85. That is, sugar coatings that have in the past been prepared to exhibit high sucrose crystallinity (as a percentage of total sucrose), most often contain sweeteners in the form of mostly or all sucrose and no or low amounts of non-sucrose sweetener or other non-sucrose soluble solids. See FIG. 1. High sucrose crystallinity has not been previously achieved in sugar coatings prepared to exhibit a lower sucrose ratio, that include a relatively higher amount of non-sucrose soluble solid, e.g., sugar coatings that include a reduced relative amount of sucrose (reduced sugar) by replacing sucrose with non-sucrose soluble solids. FIG. 1 is again illustrative. Note: the data points of FIG. 1 indicated to show sucrose ratio and crystallinity of prior art or previous coating compositions and located below the dashed line are not necessary a complete listing of all prior art coatings; these data points are not a representation that other or additional prior art coatings do not exist, and are not a representation or assertion that other prior art coatings do not exhibit sucrose ratio and crystallinity values different from the illustrated data points, e.g., located more close to but still below dashed line 10.

As shown in FIG. 1, coatings as described can exhibit a desired combination of moderate or high sucrose crystallinity, while at the same time exhibiting a ratio of sucrose to soluble solids (i.e., a "sucrose ratio") that is below the high end of a range of this ratio. As shown at FIG. 1, certain prior art sugar coatings can exhibit sucrose crystallinity of greater than 0.50, but do so with coatings having a sucrose ratio that is above 0.8, e.g., at least about 0.85 or 0.9. According to the present description, desirable sucrose crystallinity (e.g., above 0.4 or above 0.5) can be achieved even with a sucrose ratio that is below 0, e.g., below 0.8.

For example, a dried sugar coating as described herein, containing crystalline sucrose, non-crystalline sucrose, non-sucrose soluble solids, and optional insoluble solids, can be characterized as having a "sucrose ratio" calculated as the total amount (by weight, dry) of sucrose in a dried coating divided by the total amount (by weight, dry) total soluble solids (i.e., sucrose solids plus non-sucrose solids, but not insoluble solids). According to embodiments of coating as described, a dried coating can exhibit a desired combination of moderate or high sucrose crystallinity, as well as a reduced sucrose ratio. As one manner of describing the desired combination of sucrose crystallinity to sucrose ratio, crystallinity of the sucrose can be a value y, $$\text{crystallinity}(y) \geq 2.28x^2 - 1.19x + 0.28$$

wherein x is a ratio of weight sucrose per total weight soluble solids in the coating. Stated in alternate terms, embodiments of dried coatings can exhibit a sucrose crystallinity of at least 0.30, 0.35, 0.40, or 0.50 and also a sucrose ratio is a range between from 0.4 or 0.50, to about 0.80; e.g., a sucrose crystallinity of at least 0.50 and a sucrose ratio is a range between 0.40 and 0.80; e.g., a sucrose crystallinity of at least 0.50 and a sucrose ratio is a range between 0.60 and 0.80.

The sucrose crystallinity of the dried coating can be measured by standard methods of differential scanning calorimetry, typically measuring crystallinity at a temperature in a range from 200 to 250° F. (or 100 C to 200 C).

A dried coating contains sucrose and non-sucrose ingredients. The non-sucrose ingredients may include soluble ingredients such as non-sucrose sweetener; non-sucrose polysaccharides and other bulking agents, soluble fillers or soluble fiber; soluble flavorants; or soluble salts such as sodium chloride. The dried coating can also include insoluble ingredients such as insoluble flavorants (cinnamon, cocoa, vanilla, etc.), fat (e.g., oil), insoluble salts such as calcium carbonate, and coloring agents such as titanium dioxide. An amount of residual water will also typically remain in the dried coating.

A dried coating can be prepared by applying two or more different coating materials onto a food piece, such as a cereal base, with drying. Four examples of "coating materials" include, a sweet oil, a sugars slurry, a sucrose slurry, and a non-sucrose slurry coating material.

A "sweet oil" is a coating material that includes a mixture or slurry containing fat (e.g., oil) and sucrose crystals. The terms "fat" and "oil" are used interchangeably herein to refer to all types of fats and oils, including room temperature solid fat materials that may generally be referred to as "oils," as well as fats or oils that are solid at room temperature.

A "sugars slurry" is a coating material that includes dissolved sucrose and additionally contains non-sucrose soluble solids such as a soluble non-sucrose sweetener. Sucrose is generally present in an amount not exceeding 80 weight percent on a dry basis. Non-sucrose soluble solids are generally present in an amount of at least 15 or 20 weight percent on a dry basis. A sugars slurry may contain water and may also contain a minor amount of insoluble ingredients (generally understood herein to include ingredients such as fats, insoluble flavorants, insoluble salts, and insoluble colorants). The term sugars "slurry" refers to certain coating materials that are mainly soluble sucrose and soluble non-sucrose ingredients; however, this coating material may optionally include an amount of insoluble or solid (e.g., crystalline sucrose) materials so the term "sugars slurry" is used herein to refer to embodiments of this coating material that do and that do not contain insoluble or solid (non-dissolved) ingredients.

A "sucrose slurry" (which is different from the "sugars slurry") is a coating material that includes a high amount of sucrose, e.g., at least 80 weight percent, mostly in a non-crystalline state (i.e., in a dissolved state). The term sucrose "slurry" refers to certain coating materials that mainly constitute soluble sucrose dissolved in water (i.e., a sucrose solution); however, this coating material may optionally include an amount (e.g., up to about 20 weight percent in total) of insoluble solid materials or non-dissolved material (e.g., sucrose crystals), and the term "sucrose slurry" is used to refer to embodiments of this coating material that either do or do not contain insoluble or non-dissolved ingredients. The sucrose slurry can also include non-sucrose soluble solids.

A "non-sucrose slurry" is a coating material that includes a high amount of non-sucrose soluble solids, e.g., at least 70, 80, or 90 weight percent non-sucrose soluble solids as that term is used herein. Other ingredients can include insoluble solids, optionally a small amount of sucrose, and optional water. The term non-sucrose "slurry" refers to certain coating materials that are mainly soluble materials; however, this coating material may optionally include an amount of insoluble solid materials or soluble solid materials (e.g., crystalline sucrose), and the term "non-sucrose slurry" is used to refer to embodiments of this coating material that either do or do not contain insoluble or solid soluble ingredients.

In one embodiment, a described method of the present description includes a first step of providing a food product base such as a dried cereal base, preferably in the form of a quantity of individual pieces. A dried coating can be placed on the food product base by coating one or more coating material as described herein onto the base, optionally as multiple layers, and by any of a variety of orders or application methods. The coating materials can be dried individually (e.g., between application of different coating materials) or together to form a dried coating.

Certain somewhat more specific examples of such methods can include a step of topically applying a low amount of a sweetened fluid fat and-powdered sucrose (an example of a sweet oil coating material) to a cereal base as an undercoat to at least a portion of the exterior surface of the base to form a fluid fat powdered sucrose slurry coated base. The weight ratio of oil (i.e., fat) to powdered sucrose in the sweet oil can range from about 20:1 to 1:2, e.g., from about 20:1 to 1:1. The fluid fat and powdered sucrose can be applied together in the form of a premixed oil and powdered sugar/sucrose slurry. Fat mimics such as esterified sucrose marketed by P&G under the Olestra brand name can be used in full or partial substitution for the fluid fat.

Exemplary methods can include a step of applying to the oil-and-powdered sugar coated base a major amount of a low sucrose level (i.e., less than or equal to 80 weight percent on a dry basis) and high non-sucrose soluble solids level (i.e., at least 20 weight percent on a dry basis) sugar syrup (a form of sugars slurry) as an overcoat to provide a wet, sweetened oil and sugar syrup coated base.

An exemplary overcoat formulation can be in the form of a slurry syrup (a form of sugars slurry) containing from about 10%-30% by weight moisture when applied. The syrup (sugars slurry) can optionally be applied heated, e.g., at a temperature of about 200-250° F. An exemplary overcoat formulation (broadly, a sugars slurry) can comprise: from about 40 to about 80 weight percent sucrose (dry weight basis); at least 15 weight percent non-sucrose soluble solids; and optionally about 5 to about 12 weight percent insoluble solid ingredient.

Exemplary methods can include a step of drying applied coating materials to a moisture content of 5 weight percent or less to form a low sucrose level pre-sweetened finished cereal products with improved resistance to hygroscopicity.

Other methods as described in more detail elsewhere herein include other approaches of applying coating materials to a food piece, such as methods referred to herein as the "dual slurry" method, the "combined sweet oil and dual slurry" method (the "combined method" for short), and the "dry charge" method. Any of these or other coating methods may be used for placing a dried coating as described onto a food piece.

In one product aspect, the present description relates to improved dried sugar coated food products that are sucrose reduced in the form of a dried coating. The food products include a base such as breakfast cereal pieces. Examples of coated food products can include a two component (two coating material) coating system applied to at least a portion of a surface of the base pieces. Such a coating can include a first, minor amount of a primer or under-layer coating comprising a sweetened oil (i.e., "sweet oil") mixture of edible oil and crystalline (e.g., powdered) sucrose. The coating can additionally include a major amount of a second top coating overlaying the sweetened oil base coating. The top coating (sugars slurry) can include a sweetening blend containing from about 40 to about 80 percent by weight (dry basis) sucrose and from about 15 to about 50 percent by weight (dry) non-sucrose soluble solids including non-sucrose sweetener. The sucrose in the dried coating has a crystallinity value of 0.30 or greater, e.g., 0.35 or greater, such as 0.4 or 0.5 or greater.

In alternate product embodiments a dried coating can be prepared to include coated layers of a sucrose slurry and a non-sucrose slurry in optional combination with a sweet oil. Yet another embodiment can be prepared to include coated layers of a sugars slurry and dry sucrose particulates. These and other product embodiments prepared according to different coating processes using various described coating materials, are described hereinbelow in added detail.

Throughout the specification and claims, percentages are by weight and on a dry basis, and temperatures in degrees Celsius, unless otherwise indicated. All referenced patents and patent application herein are hereby incorporated by reference.

In one embodiment the invention relates to a method for preparing a pre-sweetened comestible. The method comprises: providing a base of dried food pieces having an exterior surface, and applying minor amount of a first sweetened liquid edible fat-and-powdered sucrose slurry to at least a portion of the exterior surface of the base to form a first sweetened oil slurry coated base. The weight ratio of oil to powdered sugar ranges from about 20:1 to about 1:1. The powdered sugar has a mean particle size of less than 100 microns. And the weight ratio of base to powdered sugar in the slurry of the sweetened oil slurry ranges from about 20:1 to about 1000:1. Next a major amount of a second, sugar syrup coating is applied to the base pieces as a coating or layer. The sugar syrup coating composition comprising 80% or less sucrose (dry weight basis of syrup), at least 15% of a second non-sucrose supplemental soluble solid (dry weight basis of syrup), a balance of other undissolved ingredients, and sufficient moisture to form a syrup. The weight ratio of base to second sugar syrup coating can range from about 100:10 to 100:100 to provide a wet, sweetened oil and sugar syrup coated base. The wet, sweetened oil and sugar syrup coated base is dried to a moisture content of about 1-5% to provide a presweetened dry coated comestible having a sucrose crystallinity value of at least 0.35.

In another aspect the invention relates to a sweetened dry coated comestible, comprising: about 40% to 95% of the comestible of a base of food pieces; and from about 5 to 60% of the comestible of a coating on at least a portion of the base pieces. The coating includes a first minor amount of an under-layer coating comprising a sweetened oil mixture of edible oil and powdered sucrose, and the balance a second major amount of a second top coating overlaying the sweetened oil coating. The top coating comprises a sweetening blend comprising about 40-80% sucrose, and about 15-60% non-sucrose soluble solid. The weight ratio of sucrose to soluble solids is in a range from about 0.4 or 0.5 to 0.8, and the sucrose has a crystallinity of about 0.35 or greater.

In another aspect the invention relates to a pre-sweetened comestible comprising a coated base. The comestible includes: a base and a dried coating at a surface of the base, the dried coating comprising sucrose and non-sucrose soluble solids. The crystallinity of the sucrose in the dried coating is a value y or greater calculated according to the formula:

$$\text{crystallinity}(y) \geq 2.28x^2 - 1.19x + 0.28$$

wherein x is a sucrose ratio of weight sucrose per total weight soluble solids in the coating.

In another aspect the invention relates to a method for preparing a pre-sweetened comestible comprising a base and a dried coating. The method includes: providing a base, and forming a dried coating on the base. The dried coating is formed by: applying sweet oil to the base, the sweet oil comprising oil and sucrose, the sucrose being at least partially crystalline; and applying a separate sugars slurry to the base, the sugars slurry comprising sucrose and non-sucrose solids.

In another aspect the invention relates to a method for preparing a pre-sweetened comestible comprising a base and a coating. The method includes: providing a base, and forming a coating on the base. The coating is formed by providing a sweet oil comprising sucrose and oil, the sucrose being at least partially crystalline; providing a separate sugars slurry comprising sucrose, non-sucrose soluble solids, and water; combining the sweet oil and the sugars slurry to form a mixture; and applying the mixture to the base.

In another aspect the invention relates to a method for preparing a pre-sweetened comestible comprising a base and a coating. The method includes: providing a base and forming a coating on the base. The coating is formed by: applying a non-sucrose slurry to the base; applying sweet oil to the base, the sweet oil comprising oil and sucrose, the sucrose being at least partially crystalline; and applying a sucrose slurry comprising sucrose and water to the base.

In another aspect the invention relates to method for preparing a pre-sweetened comestible comprising a base and a coating. The method includes: providing a base, and forming a coating on the base. The coating is applied by: applying a non-sucrose slurry to the base, and separately applying a sucrose slurry comprising sucrose and water to the non-sucrose slurry-coated base.

DETAILED DESCRIPTION

Figure 1:
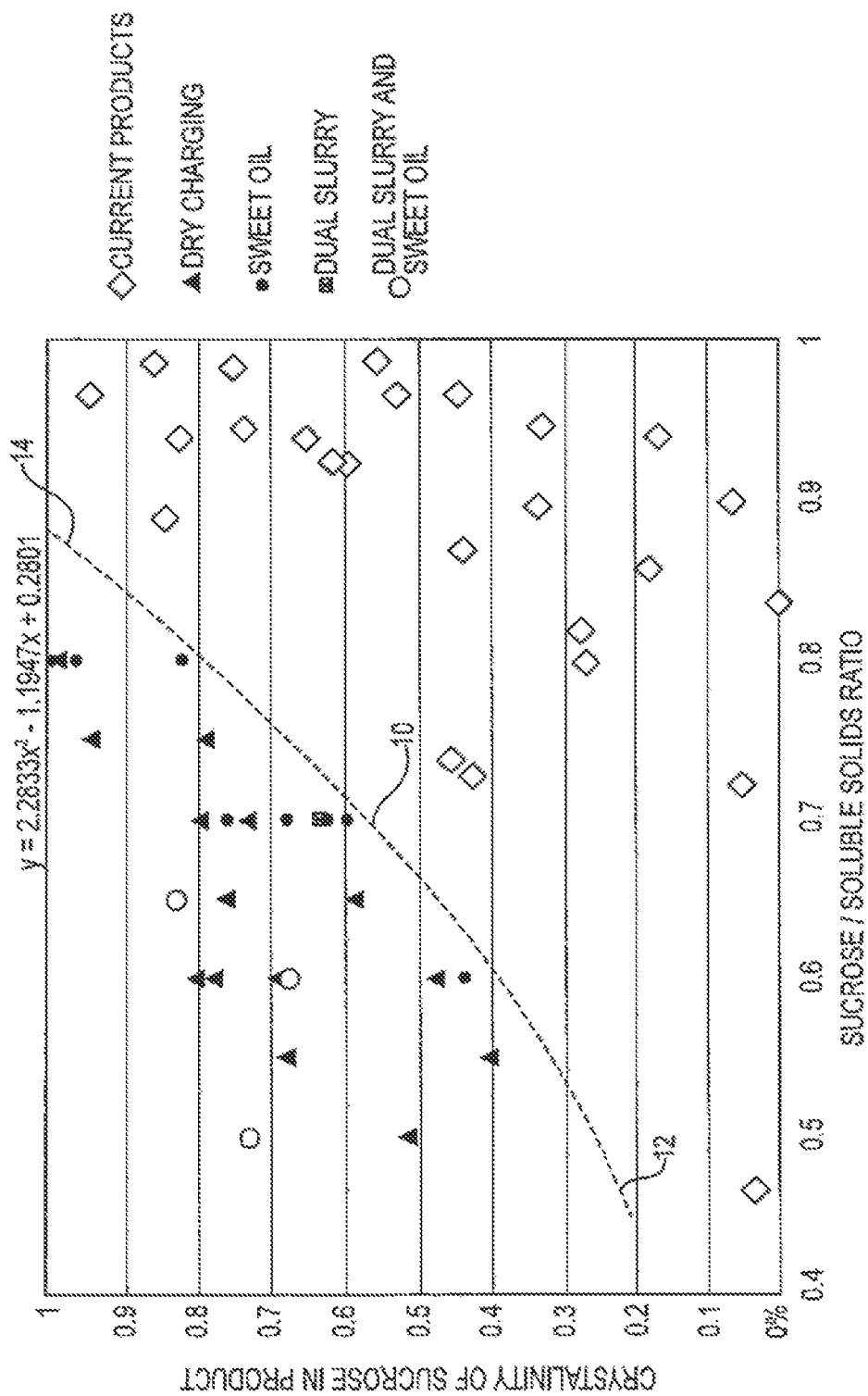
FIG. 1 shows examples of sucrose crystallinity versus sucrose/soluble solids ratio for various coatings.

The present description relates to food products that include a sugar coating, including but not limited to pre-sweetened breakfast cereal products, and to methods for making sugar-coated food (e.g., cereal) products. Broadly, embodiments of the described finished food products include a food product base and a dried sugar coating on the base.

The sugar coating contains sucrose, and the sucrose is present at least in part in a crystalline form with a portion also normally present in a non-crystalline form. As the coating is placed or prepared and dried at a food product surface, the crystalline portion of the sucrose can be placed or formed as part of the coating, preferably but not necessarily at the outer surface. In certain embodiments, sucrose that is contained in one or more coating material applied to the food piece can coalesce and form or grow sucrose crystals as water is removed from the coating material during a drying step. Crystal formation and growth can be encouraged according to various coating techniques and by use of various coating materials, such as by including seed crystals (solid sucrose particles) in a coating material to act as nucleation sites, by separating dissolved sucrose from sucrose crystallization inhibitors, or both. Non-crystalline sucrose refers to sucrose that is not in a crystal form, e.g., that may be amorphous or dissolved in other non-sucrose solid materials.

Not all sucrose present in a dried coating will be part of a crystalline sucrose particle. Some sucrose molecules present in a coating material (before drying) may not become crystallized upon formation of the dried coating if those sucrose molecules are unable to contact a sucrose crystal or sucrose seed particle to grow a crystal, or a sufficient number of other sucrose molecules to coalesce and form a crystal. For example, non-sucrose solids present in a coating material, especially non-sucrose soluble solids, can prevent sucrose molecules of the coating material from contacting crystalline sucrose or from otherwise being able to form into a crystal. Upon drying of a coating material containing non-sucrose soluble solids, isolated sucrose molecules that are unable to become part of a crystal will remain in the dried coating in an amorphous, absorbed, or otherwise non-crystalline form.

Yet the presence of crystalline sucrose can produce advantageous product traits in a sugar coating or sugar coated food product (e.g., breakfast cereal). Crystalline sucrose is generally understood to provide moisture resistance because crystalline sucrose is less hygroscopic than non-crystalline sucrose or other non-sucrose amorphous solids that may commonly be used in a sugar coating, such as many non-sucrose soluble solids ingredients including non-sucrose sweetener ingredients like corn syrup, honey, molasses, and other similar concentrated non-sucrose saccharide-based materials. According to the present descriptions, therefore, a relatively high degree of sucrose crystallinity in a sugar coating can be favored to improve moisture resistance of a sugar coated food product. The moisture resistance can be apparent as a desired product trait, for example resulting in desired, improved, or extended crunch, bite, bowl time, and reduced stickiness between coated food pieces during processing, handling, and storage.

Coatings as described include an amount of sucrose in crystalline form, and optionally (and normally) an amount of sucrose in the form of non-crystalline sucrose. The "crystallinity" value of sucrose in a dried coating refers to a ratio of sucrose in the coating that is crystalline sucrose, per the total amount of crystalline and non-crystalline sucrose in the coating. Exemplary crystallinity values of dried coatings as described herein include crystallinity in a range from about 0.30 to about 1, e.g., from about 0.35, 0.40, or 0.5 to about 1.0. See FIG. 1.

The sugar coating can optionally also include water insoluble ingredients sometimes referred to herein as "insoluble solids." Insoluble solids can include ingredients useful in a coating material or dried sugar coating, including, for example, fat; colorants or insoluble salts such as titanium dioxide or calcium carbonate; insoluble flavorants such as cocoa, cinnamon, vanilla, and the like; and preservatives or other minor ingredients. The amount of insoluble solids in a dried coating can be, e.g., from about 0 to about 20 percent, such as from 1 to about 15 or 2 to about 10 percent by weight on a solids (dry) basis. Consistent therewith, oil may be present in a relatively low amount, such as from about 0 to about 10 weight percent of the dried coating on a dry basis, e.g., from about 0.5 to about 5 weight percent. Also consistent therewith, insoluble flavorant may be present in a relatively low amount, such as in a range from 0 to about 10 weight percent of the dried coating on a dry basis, e.g., from about 1 to about 3 or 4 weight percent on a dry basis.

Examples of coating materials and examples of dried coatings can include non-sucrose soluble solids, which refers to soluble (i.e., water soluble) non-sucrose solid materials that include sweetener materials or sweetener ingredients (e.g., non-sucrose sugars and polysaccharide sweeteners), soluble fiber, and other non-sweetening polysaccharides; these include non-sucrose monosaccharides, di-saccharides, tri-saccharides, higher poly- and oligo-saccharides, etc., including examples that are useful for sweetening and examples that are non-sweetening. Soluble salts such as sodium chloride are also considered non-sucrose soluble solids and may be included in a coating material or a dried coating as described.

Non-sucrose soluble solids can be present in a dried coating in an amount to result in a sucrose ratio as described herein, e.g., between about 0.4 and about 0.80, and consistent with that sucrose ratio may be present in a dried coating in a range from about 15 to about 50 weight percent, e.g., from about 20 to about 50 weight percent based on total weight of the dried coating (dry basis). Soluble salt such as sodium chloride, considered a non-sucrose soluble solid, may be present in a coating material or a dried coating in an amount consistent with this description, such as an amount of from about 0 to about 1 or about 2 weight percent soluble salt per total weight dried coating on a dry basis.

In certain dried pre-sweetener coatings for RTE cereals, corn syrup, corn syrup solids, or a combination of these, can make up from about 1 to about 50 weight percent of the dried coating (on a dry basis), such as from about 5 to about 35 weight percent (dry basis).

Optionally a dried coating can also include a useful amount of artificial sweetener or high-intensity natural sweetener to adjust total sweetness as desired or necessary to counteract a reduction in sweetness caused by a reduction in sucrose or other sugar ingredients. Artificial sweeteners are known and include saccharine, aspartame, sucralose, and other non-saccharide-based sweetening ingredients. High intensity natural sweeteners are also known and are described herein (see infra). Any of these sweeteners can be included in a coating at a useful amount, which may be an amount to increase sweetness as desired. A useful amount may be less than 1 percent by weight (dry basis) or less than about 0.5 or 0.1 percent by weight (dry basis) for certain artificial sweeteners, or as low as 100 parts per million or below, 50 parts per million or below, or 10 parts per million or below for certain high-intensity sweeteners.

The coating in its final form can be referred to interchangeably as the "coating" (as opposed to a "coating material") or the "dried coating," which means that the coating has been subject to a drying step to remove water and includes what is generally a small amount of water, e.g., less than 5 percent by weight of the coating, this small amount of water being present even after the dried coating has been formed from coating materials that may include larger amounts of water and then processed to remove a majority of the water from the applied coating materials.

A coating can be made of a multiple coating materials applied consecutively with drying between applied coating materials, applied consecutively without drying between applied coating materials, applied simultaneously, applied as a mixture formed shortly prior to application, or by a combination of these sequences. A "coating material" refers to a material before or upon application to a surface of a food product (or a coating on a surface of the food product) during a coating process, before being dried. Examples of coating materials are described herein and include a sugars slurry, a sweet oil, a sucrose slurry, and a non-sucrose slurry. Each of these various coating materials will include a portion of the ingredients that will make up the coating, which ingredients include sucrose (optionally dissolved or crystalline in a coating material), non-sucrose soluble solids, optional insoluble solids such as oils or other insoluble flavorants, and optional water to facilitate application of the coating material onto a surface of a food piece.

Water will be removed from a coating material upon drying. Also upon drying, coating materials placed on a surface may form a single layer of dried material that includes sucrose crystals. In other embodiments coating materials applied in sequential steps may form multiple discernible layers of a coating, e.g.: application and optional drying of a first layer, then application of another layer upon the (optionally dried) first layer, may result in a coating that includes two identifiable layers. A dried coating may also be formed to include multiple coating materials applied in a sequence or series, or simultaneously, and then dried in a single drying step; the dried coating may or may not exhibit indications of the different (optionally separately dried) layers of coating materials applied and optionally dried in a series of separate steps.

Figure 2:
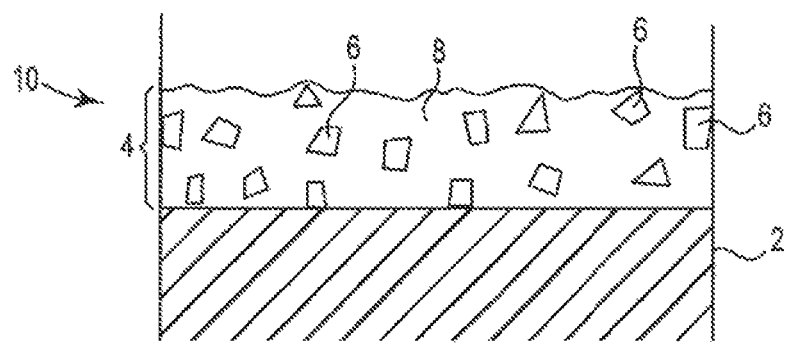
FIG. 2 shows an example of a coated food piece.

FIG. 2 shows an example of a surface of a coated food product such as a coated cereal piece according to the present description. Sugar coated food piece 10 includes cereal piece or base 2 and dried coating 4 present at a surface of piece 2. Dried coating 4 includes sucrose in a crystalline form as sucrose crystals 6. Sucrose crystals 6 are disposed in a non-crystalline (e.g., amorphous) matrix 8 that includes non-sucrose solids (soluble and optionally insoluble) as described herein, optionally a small amount of moisture as described herein, and typically an amount of dissolved or otherwise contained non-crystalline sucrose.

Matrix 8 can be generally homogeneous as illustrated at FIG. 2. Alternately, depending on the manner by which dried coating 4 is formed, matrix 8 or dried coating 4 may exhibit (or be represented as) discernible layers produced by applying two or more separate coating materials to the surface to form coating 4. Exemplary layers may include a dried layer of a sweet oil, a dried layer of a sugars slurry, a dried layer of a sucrose slurry, and a dried layer of a non-sucrose slurry. The presence or absence of discernible layers within a matrix 8 or dried coating 4 is an optional and not a required feature of dried coating 4. Discernible layers within dried coating 4 are not a requirement of any coating, food piece, or coating method of the present description.

According to certain described embodiments, a coating material, method, or dried coating can involve dried food bases or pieces that are beneficially coated or combined with a coating as described, e.g., having a desired sucrose ratio and sucrose crystallinity as described. A food piece base can be of any dried food type that may desirably be provided with a sweetened coating. For example, a food base can include or be in the form of dried fruit pieces, nuts or nut pieces, pretzels, cookies, puffed snack pieces such as popcorn or fried expanded pieces and mixtures thereof, as well as a cereal piece.

The presently described methods, coating materials, and coatings can find particular suitability for use with pre-sweetened Ready-to-Eat breakfast cereals. RTE cereal products can include, for example, a cereal base as the food base comprising pieces or quantities of puffed or unpuffed grains, grain-derived ingredients such as flours and starches, and the like. A cereal base can be one or more common shaped and sized pieces of RTE cereal, whether in the form of flakes, puffs, shreds, biscuits, O's, letters, figurines, nuggets, and mixtures thereof, fabricated from a cooked cereal dough. The cereal can also or alternately be in the form of puffed pieces of wheat, rice, corn, etc. In some embodiments the pieces are dried food pieces having a moisture content of about 1 to about 5 percent by weight after drying. In other variations, the base can be in the form of puffed or unpuffed pieces. An example of an unpuffed (but possibly leavened) base piece is a cookie or biscuit. A partially puffed piece can be, for example, a square (i.e., a generally planar piece formed by toasting pieces cut from a cooked cereal dough sheet or ribbon).

Any conventional puffed or unpuffed cereal or method of preparation can be used herein to provide a cereal base. The food and cereal arts are replete with such food compositions and their methods of preparation and the skilled artisan will have no problem selecting suitable compositions or methods of preparation. Exemplary compositions and methods of puffed cereal preparation are found in, for example, U.S. Pat. No. 3,464,827, (issued Sep. 2, 1969 to T. Tsuchiya, et al.); U.S. Pat. No. 3,600,193, (issued Aug. 17, 1971 to E. F. Glabe, et al.); U.S. Pat. No. 3,246,990, (issued Apr. 19, 1966 to Thompson, et al.); and U.S. Pat. No. 3,687,687, (issued Aug. 29, 1972 to A. L. Liepa).

A cooked cereal dough can be prepared by blending dry ingredients together with water and cooking to gelatinize starchy components and to develop a cooked flavor. The cooked material can be mechanically worked to form a cooked cereal dough. The cooking and mechanical work can occur simultaneously or sequentially. The dry ingredients can also include various additives such as sugar or other sweetener, salt and mineral salts, e.g., trisodium phosphate, and starches. In addition to water, various liquid ingredients such as corn (maize) or malt syrups can be added.

A preferred component of a cereal composition as described is a starchy cereal component. The starchy cereal component can comprise any conventional starchy cereal or, synonymously, farinaceous material, for use in a ready-to-eat cereal. Exemplary suitable starchy cereals include cereal grains, cut grains, grits, and flours, derived or prepared from wheat, rice, corn, oats, barley, rye, triticale, other cereal grains, and mixtures thereof. The flours can be whole flours or flour fractions such as with the germ fraction or husk fraction removed or, alternatively, brans. A starchy cereal component can constitute from about 40 to about 99 weight percent (dry basis) of a cooked cereal dough composition, e.g., from about 75 to about 95 weight percent (on a dry basis) of the cooked cereal dough composition, or from about 80 to about 95 weight percent (on a dry basis). In certain embodiments, all or a portion of the starchy cereal component can be provided in the form of whole grain flours.

A cooked cereal dough can include from about 10 to about 55 weight percent moisture. The amount of moisture depends in part upon the particular cereal ingredients, desired finished products, cooking equipment, and techniques used. A dried finished (un-coated) cereal product prepared from a cooked cereal dough product can include from about 3 to about 12 weight percent moisture, e.g., from about 4 to about 6 weight percent moisture, based on the total weight of the dried finished cereal product.

If desired, a cereal dough composition for use as described can additionally include sugar or non-sugar sweetener in an amount in a range from about 0.1 to about 15 weight percent (dry weight), which includes, for example, nutritive carbohydrate sweetening agents; preferred amounts of sugar (e.g., sucrose) or non-sugar sweetener can be in a range from about 0.5 to about 5 weight percent (dry basis). Useful herein as the sugar is sucrose. However, a sugar can alternately or additionally include fructose, maltose, dextrose, honey, fruit juice solids, brown sugar, and the like. In addition to providing desirable sweetness, the sugar additionally beneficially affects the cereal color and texture. As an example for an RTE cereal product, a cereal can include 2 weight percent or less sugar by weight (dry basis). If desired, a base piece can be sweetened by high potency sweetener.

According to certain embodiments of ready-to-eat cereals, a cereal base can exhibit a low fat level, e.g., the cereal may exclude added or absorbed fat ingredients, although minor amounts of added fat in the form of processing agents such as emulsifiers or flavor ingredients can be present. Thus, the total fat or lipid component can be relatively low. The fat content may be provided entirely from the native fat associated with a starchy cereal component. According to particular embodiments, total added fat (i.e., non-native fat from constituents) to a cereal can be less than about 6 weight percent, for example less than about 2 weight percent (on a dry basis). According to some examples an RTE cereal can be substantially free of fat incorporated into the cooked cereal dough.

If desired, a cereal dough composition can additionally include any of a variety of ingredients designed to improve the aesthetic, organoleptic, nutritional, or nutriceutical qualities of the cereal. These adjuvant materials can include vitamins, minerals, colors, flavors, high potency sweetener, and mixtures thereof. The precise ingredient concentration can vary in known manner. In certain embodiments, an RTE cereal can be fortified with bioavailable sources of calcium, iron, riboflavin, and the like. Generally, however, such materials can each make up from about 0.01 weight percent to about 2 weight percent (dry basis) of a cereal composition.

The described raw cereal components and other ingredients can be cooked and worked to form a cooked cereal dough by conventional cooked cereal dough preparation methods. The total moisture addition is controlled to provide a cooked cereal comprising about 10 weight percent to about 35 weight percent moisture, preferably from about 25 to about 35 weight percent moisture. The cereal dough cooking step can be practiced using a batch, atmospheric cooker, or a low pressure extruder cooker, e.g., equipped with a conditioner precooker or a twin screw extruder. The cereal can be cooked by any useful method, such as with steam and a sufficient amount of added water, for a time and at a temperature sufficient to gelatinize starch and develop desired levels of cooked cereal flavor.

The cereal can be formed into any of a variety of common RTE cereal forms including spheres, shreds, biscuits, flakes; "O's"; a novelty shape (e.g., Celtic runes for products such as marketed under the brand name of "Lucky Charms"); or any other common or developed RTE cereal or cereal-based snack product form, shape, or size, such as saucers or scooped shaped configurations. One specific example of a cereal piece useful as described herein is a graham flavored planar square.

A great number of RTE cereals and snack products are prepared from cooked cereal doughs that are formed into pellets. The cooked cereal dough can be fed to a pellet former to form pellets. For example, in the preparation of RTE cereals in flake form, the pellets are sized to have a pellet count of about 35 to 50 per 10 grams and a moisture content of 16 to 20 weight percent. The pellets can be partially dried to moisture contents of about 18 to 20 weight percent. The pellets can then be formed into "wet" flakes having a thickness of about 380 to 635 μm (0.015 to 0.025 inch), preferably while warm 76.6 to 87.8° C. (170 to 190° F.) to form desirably shaped and sized wet flakes.

In another variation the dough can be sheeted to form sheets of dough (e.g., 25 to 800 microns in thickness) and the individual pieces formed by cutting the sheet into individual pieces or by stamping out planar shaped pieces from the dough sheet especially in squares. In still another variation, the cooked cereal dough can be extruded through a die imparting a desired peripheral shape to form an extrudate cooked cereal dough rope. The dough rope can be cut to form individual shaped pieces. In still another variation, the cooked cereal dough can be fed to a biscuit forming device (see, for example, U.S. Pat. No. 5,342,188, entitled "Device For Crimping and Cutting Dough Ropes," issued Aug. 30, 1994 to C. E. Zimmermann, which is incorporated herein by reference) which forms the dough into biscuit shaped individual pieces. In another preferred variation, the cooked cereal dough is formed into individual "0" shaped pieces or rings, biscuits, shreds, figurines, letters, spheres, or other geometric shapes, nuggets, or even irregular shapes.

The size of base pieces can vary. In some embodiments especially suitable for use as RTE breakfast cereals, base pieces can range from about 35 to 65 pieces per 10 grams. In some embodiments base pieces are provided as dried pieces of cooked cereal dough in the form of planar pieces (such as disks or squares having opposed major faces) having surfaces of about 100-300 mm$^2$ and measuring about 0.5-2.0 mm in thickness. For snack products the pieces can range in size from 1 to 5 grams each.

A sugar coated food product that includes a dried coating as described herein, e.g., having sucrose crystallinity and a sucrose ratio as described, can be made by any method that will provide the described features of the dried coating. The coating is not limited to preparation by any particular method. Still, certain methods of forming a dried coating on a food product have been found to be especially effective in providing desired features, such as a desired combination of sucrose crystallinity and sucrose ratio. Certain identified processes and coating materials have been found to be capable of providing increased sucrose crystallinity in a dried coating, even if the dried coating contains relatively high amounts of crystallinity inhibitors (e.g., non-sucrose sweetener or other non-sucrose soluble solids), e.g., at sucrose ratios below 0.90, below 0.85, or below 0.80.

One technique that has been found to be useful to achieve relatively increased levels of sucrose crystallinity, even in a dried coating that contains a relatively high amount of sucrose crystallinity inhibitors, is by separating crystalline sucrose from sucrose crystallinity inhibitors before and during steps of applying coating materials to a food surface. Separating sucrose from sucrose crystallinity inhibitors at application to a food piece can prevent the inhibitors from acting to inhibit crystallization of the sucrose. Sucrose can be separated from crystallinity inhibitors by placing a relatively large portion of total sucrose (in a dried coating) in one coating material (e.g., a sucrose slurry), and placing a large portion of crystallinity inhibitors (e.g., certain non-sucrose soluble solids) (of a total in the dried coating) in a separate coating material (e.g., a non-sucrose slurry) before the coating materials are applied to a food piece; these two slurries can be applied separately to the food piece surface. Another technique of encouraging sucrose to crystallize is to place sucrose crystals in a coating material (e.g., sweet oil or a dry charge of sucrose crystals); the sucrose crystals can act as nucleation sites to enhance formation and growth of sucrose crystals upon drying of a separate coating material that includes sucrose (e.g., a sugars slurry) also applied to a base. The sucrose crystals can be applied separately from the sugars slurry, or at the same time, e.g., as a mixture of two coating materials prepared immediately prior to application to prevent the sucrose crystals from dissolving.

Thus, according to certain embodiments of described processes, a dried coating can be disposed onto a food piece by application of coating materials that are designed to increase crystallinity of the sucrose in a dried coating resulting from the coating materials. By one technique, e.g., as accomplished in the "dual slurry" method and the "combined" method, crystallization is improved by separating sucrose crystallinity inhibitors from sucrose at application. A second general technique, as accomplished by the "sweet oil" and the "dry charge" methods, increases sucrose crystallinity in a dried coating by including crystallized sucrose in one coating material (e.g., sweet oil) to act as "nucleation sites" or sucrose seed particles; dissolved sucrose in a different coating material (e.g., a sugars slurry) finds the seed particles in the crystallized sucrose-containing coating material with an effect of improving total crystallization and sucrose crystallinity in the dried coating made of the two different coating materials; this method also allows for combining coating materials (e.g., a sugars slurry and a sweet oil) shortly before application.

Sweet Oil Methods

According to certain specific embodiments of the described methods a dried coating can be placed onto a food particle surface by methods that use two separate coating materials: a sugars slurry and a sweet oil. These described embodiments may sometimes be referred to herein as the "sweet oil" embodiments or methods.

A "sugars slurry" is a coating material that includes sucrose, non-sucrose soluble solids, optionally insoluble solids, and water. A portion of the total amount of sucrose in a sugars slurry can be dissolved in water or another liquid, and optionally a portion of the sucrose can be in crystalline form. Exemplary ingredients of a sugars slurry can include up to about 80 weight percent sucrose predominantly in a dissolved form, and at least about 15 weight percent non-sucrose soluble solids. The non-sucrose soluble solids can include one or more non-sucrose sweetener, non-sweetening carbohydrate, soluble fiber, or the like. The sugars slurry can optionally include other non-sucrose soluble solids (e.g., sodium chloride) as well as insoluble solids such as insoluble salts, insoluble flavorants such as cinnamon, cocoa, vanilla, or the like, and oil.

A "sweet oil" is a coating material that includes oil (i.e., any fat) and sucrose with at least a portion of the sucrose being in crystalline form. In exemplary embodiments a majority of the sucrose in a sweet oil can be in crystalline form, such as at least 50 percent, 60 percent, 70 percent, 80 percent, or 90 percent (solids by weight) of a total amount of sucrose in a sweet oil can be in crystalline form when the sweet oil is applied to a food product.

An oil useful in a sweet oil can be any oil useful to prepare a sugar coating for a food product, e.g., a ready-to-eat cereal. The oil may be a room temperature solid or a room temperature liquid, and if room temperature solid the oil can be heated for processing and application to a food piece as a component of a sweet oil coating material. Examples of useful oils include hydrogenated and non-hydrogenated vegetable oils such as cottonseed oil, soybean oil, palm oil, palm kernel oil, coconut oil, and mixtures thereof. Other examples include low-trans fatty acid liquid vegetable oils. Low trans fatty acid vegetable oils typically have about 5 weight percent or less trans fatty acids. These liquid oils typically are not hydrogenated, to prevent formation of trans fatty acids that may occur during the hydrogenation process. Examples of low trans fatty acid vegetable oils include canola oil, corn oil, cottonseed oil, olive oil, palm oil, rapeseed oil, rice bran oil, safflower oil, soybean oil, sunflower oil, or mixtures thereof.

An exemplary sweet oil coating material can include from about 5 to about 66 weight percent sucrose and from about 34 to about 95 weight percent oil (on a dry basis), e.g., from about 20 to about 50 weight percent sucrose and from about 50 to about 80 weight percent oil.

A sweet oil can be applied to a food piece at any desired amount to produce a dried coating as described herein. According to certain embodiments (e.g., a "sweet oil" method) when applied in combination with a sugars slurry, or other embodiments (e.g., a "combination method") when applied in combination with both a sucrose slurry and a non-sucrose slurry, a sweet oil may be applied to a food piece to provide a sucrose coating weight (dry basis of sucrose in the sweet oil) in a range from 0.01 weight percent to about 5 weight percent sucrose, e.g., from about 0.05 to 2 weight percent sucrose, or from about 0.1 to 1 weight percent sucrose, based on the weight of the coated finished food product (including the weight of the food base and the weight of the dried coating (dried sweet oil and dried sugars slurry).

According to an exemplary "sweet oil" method, a dried coating as described can be formed on a food piece by preparing a sweet oil coating material, preparing a separate sugars slurry coating material, and applying these two coating materials to the base. As desired, the sweet oil may be applied before the sugars slurry, after the sugars slurry, or at the same time as the sugars slurry either in separate streams or as a mixture in a single combined stream. Advantageously, a majority or nearly all of the sucrose of the sweet oil can be applied in crystalline form, and an amount of crystalline sucrose in the dried coating will be provided by this crystalline sucrose of the sweet oil. Additionally, at least a portion of sucrose included in the sugars slurry can become crystallized upon drying of the sugars slurry, to add to the total amount of crystalline sucrose present in the dried coating; the sucrose crystals of the sweet oil act as seed particles or nucleation sites to increase crystallization of the dissolved sucrose of the sugars slurry. Depending on various factors such as coating application methods, relative amounts of sweet oil and sugars slurry, ingredients of the two coating materials, etc., a dried coating made from these two coating materials may contain discernible layers of sweet oil and dried sugars slurry (see, e.g., FIG. 3B), or alternately may upon examination take on the form of a single layer of the sugar coating (see FIG. 2).

Figure 3A:
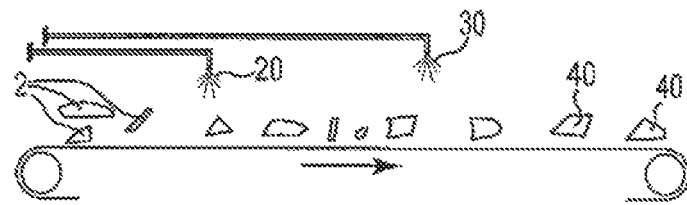
FIG. 3A shows an example of a coating method.

An exemplary method of preparing a dried coating from a sweet oil and a sugars slurry can include a step of applying a minor amount of sweet oil 20 (for example a first sweetened liquid edible fat-and-powdered sucrose slurry) to at least a portion of an exterior surface of a food piece (e.g., base) 2 to form a first sweetened oil slurry (sweet oil) coated base. Subsequently, a sugars slurry 30 can be applied to the sweet oil coated base. See FIG. 3A. FIG. 3C shows an alternate sweet oil method by which sugars slurry 30 is applied in a first coating step and sweet oil 20 is applied immediately afterward, without a drying step in between.

Figure 3B:
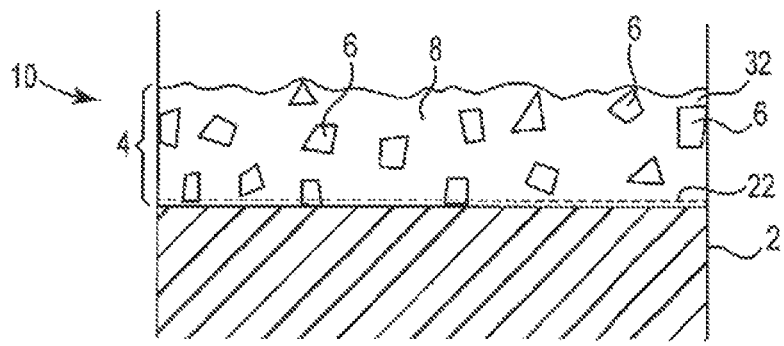
FIG. 3B shows an example of a coated food piece.
Figure 3C:
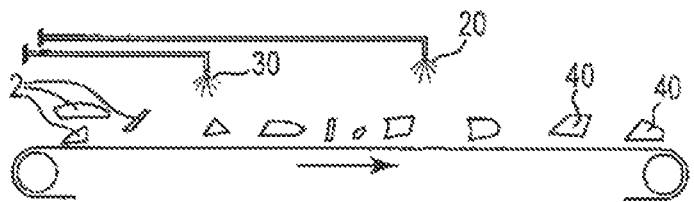
FIG. 3C shows an example of a coating method.

FIG. 3B illustrates an example of food piece 10 prepared according to an exemplary sweet oil method. Piece 10 includes dried coating 4 (having desired sucrose crystallinity and sucrose ratio as described) represented to include two layers of different coating materials applied in order: sweet oil 20 applied as undercoat 22, and sugars slurry 30 applied and dried to form overcoat 32. These layers are represented as being separated by a dashed line to indicate a potential boundary and separation between the dried layers; the separation may be gradual, may be difficult to discern, or may be indiscernible in which case coating 4 may be represented as shown at FIG. 2. FIG. 3B shows food piece 10 after drying the applied coating materials, in an exemplary embodiment wherein two layers are potentially discernible (which is not a requirement of a coating as described herein.)

According to certain sweet oil methods, the sweet oil can be applied to form an undercoat on a cereal base. The sweet oil can be as described generally herein, and can for example include a liquid (with or without heating) fat with powdered sugar (sucrose) particles suspended or dispersed within the fat. The sweet oil may be anaqueous (i.e., less than 0.1% moisture). The liquid fat can be room temperature liquid oil such as a vegetable oil, a room temperature solid fat that has been heated and melted to a liquid form, or a blend or combination of any two or more of either a room temperature liquid or (melted) room temperature solid fat. A room-temperature liquid (oil) type of fat can be provided by a common vegetable fat such as corn oil, safflower oil, soybean oil, canola oil, cottonseed oil. The fat can be provided by hydrogenated oils and especially by tropical fats such as palm oil, coconut oil, palm kernel oil. Non-tropical fats may also be used. An oil or fat ingredient can be supplied in part by minor or specialty oils such as peanut oil, almond oil, olive oil, and various blends of oils. The powdered sugar can be white cane or sugar beet sucrose. Various grinds and sizes of powdered sugar are available and can be used. Good results can be obtained when the powdered sugar has a mean particle size of 100 microns or less, e.g., 50 micron or less, e.g., from about 20 to about 35 microns, when measured using a "volume average" calculation, e.g., using a Microtrac particle size analyzer.

While wishing to not be bound by theory, it is believed that sucrose crystals present in a sweet oil placed as part of a coating material on a food piece (e.g., as an underlayer or elsewhere as an ingredient of one coating material or a combination of coating materials applied as a mixture to the food piece) can act as seed crystals to cause or promote crystallization of dissolved sucrose also present in an applied coating material on the food piece. Some past slurry coating processes include coating materials having dissolved sucrose that does not fully re-crystallize upon drying. By applying sucrose in at least partial crystalline form, e.g., in a sweet oil, instead of applying sucrose in an entirely dissolved form, a dried coating may be produced to exhibit increased sucrose crystallinity. Advantageously and beneficially, a sugar coating that has a reduced amount of total sucrose—e.g., greater than 20 weight percent (dry basis) non-sucrose soluble solids such as corn syrup, corn syrup solids, glucose syrup or glucose solids, or the like—can still exhibit a moderate to high sucrose crystallinity (see FIG. 1). The relatively high sucrose crystallinity in a dried coating can prevent undesired product traits that may otherwise be expected from using relative high amounts of non-sucrose soluble solids, e.g., increased hygroscopicity and stickiness, reduced bowl life, etc. Increased sucrose crystallinity can allow the use of relatively higher amounts of non-sucrose soluble solids (i.e., a lower sucrose ratio) without producing undesired detrimental non-taste product traits that are often associated with such increased levels of non-sucrose soluble solids. The sugar coating having relatively high sucrose crystallinity and a sucrose ratio as described can also exhibit eating qualities similar to products that include a traditional high sucrose content pre-sweetener coating.

A sweet oil can include any useful amount of oil and sucrose as described herein or as otherwise useful to allow for even coating of the sweet oil constituents, e.g., powdered sugar. An exemplary sweet oil may include a ratio (by weight) of oil to powdered sugar (e.g., sucrose) (oil:powdered sugar) in a range from about 20:1 to 1:2, e.g., from about 4:1 to 1:1, e.g., about 2:1.

The amount of a sweet oil coating material applied to a base can be relatively small compared to the total coating. Useful amounts can be as described herein or as follows, as expressed in terms of the amount (weight) of crystalline sucrose applied to a food piece by application of the sweet oil coating material. Exemplary weight ratios of food product (e.g., cereal base) to sucrose (e.g., powdered sugar) in an applied sweet oil can range from about 20:1 to about 10,000:1 (food product:powdered sugar), or from 20:1 to about 1,000:1. Stated differently, exemplary (non-limiting) application rates of sweet oil can be sufficient to coat crystalline sucrose (e.g., powdered sugar) in an amount in a range from about 5 weight percent to about 0.01 weight percent (dry basis) based on the weight of the finished food product (including weight of the food base and total weight of the dried coating).

Any conventional enrobing apparatus and technique can be used to apply a coating material as described herein, such as tumbling, spraying, or the like. Generally, a useful technique involves tumbling. It will be appreciated that the sweet oil can be admixed as needed to maintain suspension of the powdered sugar in the oil before application.

While in the above specifically-described embodiment the powdered sugar is applied in the form of a sweet oil coating material (or a "sweetened oil slurry"), or another pre-mixture of oil and crystalline sucrose or powdered sugar, in other variations the crystalline sucrose and oil can be separately applied without forming a slurry or mixture of these ingredients. For example, cereal pieces can be oil sprayed first and then a dry powdered sugar ingredient can be applied separate from the oil. In other variations, the oil and powdered sugar ingredient can be applied by simultaneous separate applications, or by applying a sugars slurry first and then applying sweet oil (or one or both of its described constituents separately, simultaneously, or otherwise) onto the applied sugars slurry (see FIG. 3C).

Exemplary sweet oil methods as shown at FIGS. 3A and 3C can include a step of applying sugar syrup (an example of a sugars slurry) 30 onto base pieces 2, e.g., as shown at FIGS. 3A and 3C, that have or have not been previously coated with sweet oil 20 (or equivalent), respectively. In the embodiment of FIG. 3A, sugars slurry 30 can be applied as a coating or over layer over the previously-applied sweet oil coating or layer 20, to provide a wet, sweetened oil and sugar syrup (sugars slurry) coated base 40. The sugars slurry (e.g., reduced-sucrose sugar syrup) 30 can be as described herein, such as a sugars slurry coating material that includes 80 weight percent or less sucrose (dry weight basis of sugars slurry), at least 15 weight percent non-sucrose soluble solids (dry weight basis of syrup), and the balance (or up to about 10 weight percent on a dry basis) other undissolved or insoluble ingredients. Sugars slurry 30 can have a moisture content ranging from about 10 to about 35 weight percent, e.g., from about 10 to 28 weight percent, for application to the food product, which moisture is substantially removed by drying to form dry coating 4. Higher moisture coating materials may facilitate processing and may allow for improved coverage of complexly patterned cereal pieces, and can be easier to pump through a coating apparatus or system.

Figure 3D:
FIG. 3D shows an example of a coating method.

In an alternate sweet oil method (not illustrated), sweet oil 20 can be applied simultaneously and separately from sugars slurry 30. In another alternate sweet oil method, as illustrated at FIG. 3D, a sweet oil 20 can be provided at a coating apparatus, and a separate sugars slurry 30 can also be provided. Before either coating material is applied to base 2, the sweet oil 20 is combined with the sugars slurry 30, e.g., within a processing line, in a mixing container or reservoir, or by a mixing sprayer head, to form mixture 35 of sugars slurry 30 and sweet oil 20. Mixture 35 is then applied as a mixture to base piece 2. Preferably, mixture 35 contains solid (crystalline) sucrose particles when applied, such that the solid sucrose particles can act as seed particles or nucleation sites for enhanced crystallization of sucrose dissolved in sugars slurry 30.

In a specific example, sugars slurry 30 can be a reduced-sucrose sugars slurry that includes from about 50 to about 80 weight percent sucrose (dry weight) as its principal sugar. It will be appreciated that such a sugars slurry is considered to be "sucrose-reduced," or "reduced sugar." "Sucrose-reduced" as used herein means that a sugars slurry or dry coating made therefrom contains less than 80 weight percent sucrose (on a dry basis) inasmuch as conventional breakfast cereal pre-sweetener coatings typically include 80 weight percent sucrose or more (on a dry basis). Traditional pre-sweetener coatings can typically contain from about 80 to about 95 weight percent (dry basis) sucrose as the principal ingredient. A reduced-sucrose sugars slurry can include at least about 15 weight percent (dry basis) non-sucrose soluble solids, e.g., at least 20 weight percent (dry basis) non-sucrose soluble solids.

Non-sucrose soluble solids of a coating material can include non-sucrose supplemental or secondary sugars, nutritive carbohydrate sweetening ingredients, other (e.g., non-sweetening) soluble polysaccharides, soluble fiber, etc.

A secondary or non-sucrose sugar refers to common non-sucrose nutritive mono-saccharide sweetening agents including glucose, dextrose, and fructose, and polysaccharides as found in corn syrup, corn syrup solids, and other grain syrups (e.g., molasses, wheat syrup, barley syrups, maltose syrups, oat syrup, tapioca syrups and mixtures thereof), malt syrups, malt syrup solids, rice syrup solids, rice syrups, and sorghum syrups.

Nutritive carbohydrate sweetening ingredients are compositions of concentrated amounts of sweetening ingredients such as monosaccharides, e.g., dextrose (e.g., anhydrous, monohydrate or dextrose syrup), fructose, tagatose, mannose, and galactose; non-sucrose disaccharide sugars such as, maltose, trehalose, and lactose; as well as hydrolyzed starch syrups such as corn syrup which includes dextrin, maltose, and dextrose, invert sugar syrups which include levulose and dextrose, and converted fructose or glucose syrups, dextrose, fructose, crystalline fructose, lactose, malt syrup, malt syrup solids, rice syrup solids, rice syrup, sorghum syrup, invert sugar, refiners syrup, corn syrup, corn syrup solids, corn fiber, maltose, high fructose corn syrup, honey, molasses. In other variations, non-sucrose soluble solids can include saccharides supplied by impure or flavored saccharidic ingredients such as fruit juices, purees, honey nectars, concentrated fruit, and the like. Some of these non-sucrose soluble solids materials or ingredient include minor amounts of sucrose. A nutritive carbohydrate component of non-sucrose soluble solids as described herein may commonly be provided by such nutritive carbohydrate sweetening ingredients as extra fine ground (non-sucrose) sugar, or a syrup ingredient such as corn syrup, corn syrup solids, high fructose corn syrup, glucose syrup, glucose solids, or another similar concentrated sweetener syrup ingredient.

Non-sucrose soluble solids also can include soluble fiber, with certain examples including, soluble corn fiber, polydextrose, hydrolyzed guar gum, inulin (or other oligosaccharides especially frusto-oligosaccharides), and mixtures thereof.

Non-sucrose soluble solids can also include soluble salt such as sodium chloride, which may be present in an amount consistent with this description, such as an amount of from about 0 to about 1 or about 2 weight percent of a dried coating on a dry basis.

An exemplary sugars slurry, e.g., having a reduced amount of sucrose, can include (as non-sucrose soluble solids) from about 1 to about 50, e.g., from about 5 to about 35 weight percent (dry basis) of a sugar syrup or sugar syrup ingredient such as corn syrup, corn syrup solids, soluble corn fiber, glucose syrup, glucose syrup solids, honey, molasses, another concentrated syrup ingredient, or a mixture thereof, based on total weight sugars slurry (dry basis). A syrup or syrup solids can be used in whole or in part for a supplemental non-sucrose sweetener.

"Dual Slurry" Coating Materials and Method

According to another embodiment of a method for preparing a coating as described, a sugar coating can be placed and formed on a food particle surface by methods that involve two separate coating materials: a sucrose slurry, and a non-sucrose slurry. These described embodiments may sometimes be referred to as the "dual slurry" embodiments or "dual slurry" methods. According to such a method, a substantial portion of a total amount of sucrose in the dried coating is included in the sucrose slurry, and a substantial portion of the total amount of non-sucrose soluble solids of the dried coating is included in the non-sucrose slurry. (The sucrose slurry may include generally a small amount of non-sucrose soluble solids, and the non-sucrose slurry may include a generally small amount of sucrose.) Either slurry may include insoluble solids as desired. Placing a high amount of the sucrose of a final coating into one coating material, and placing a high amount of the non-sucrose soluble solids (which can act as sucrose crystallization inhibitors) of a final coating in another coating material, can increase the ability of the sucrose in the one coating material to form crystals upon application and drying, resulting in a relative increase in sucrose crystallinity in the dried coating.

The sucrose slurry contains sugar (sucrose) and water, and may include a minor amount of non-sucrose solids (soluble, insoluble, or both). For example, a sucrose slurry can contain from about 80 to about 100 weight percent sucrose and from about 0 to about 20 weight percent non-sucrose solids on a dry basis, and e.g., from about 90 to about 100 weight percent sucrose and from about 0 to about 10 weight percent non-sucrose solids. The sucrose is substantially or entirely dissolved.

The non-sucrose slurry contains a major amount of non-sucrose soluble solids (e.g., non-sucrose sweetener optionally present in the form of a sugar syrup ingredient), optional insoluble flavorant, oil, optional soluble or insoluble salt, water, and optionally a minor amount of sucrose. For example, a non-sucrose slurry can contain from about 80 to about 100 weight percent non-sucrose soluble solids, from about 0 to 20 weight percent insoluble solids such as insoluble flavorant, oil, or insoluble salt, and only a minor amount of sucrose if any, such as below about 20 weight percent, e.g., below 10 or below 5 weight percent, preferably below 2 or below 1 percent by weight sucrose (all on a dry basis).

A non-sucrose slurry may be made to include or may predominantly include an ingredient that contains a high amount of non-sucrose solids such as a non-sucrose saccharides and polysaccharides, e.g., a "sugar syrup," a commercially available syrup ingredient, or a natural syrup ingredient. Such an ingredient can be convenient for placing a concentrated amount of non-sucrose soluble solids in a non-sucrose slurry and may be present in a non-sucrose slurry in an about from about 5 to about 100 weight percent, e.g., from 5 to about 90, 5 to about 80, or 5 to about 35 weight percent (dry basis) of the non-sucrose slurry. Examples of commercially available syrup ingredients (a.k.a. "sugar syrup"), a natural syrup ingredients, or their equivalents include: corn syrup, corn syrup solids, soluble corn fiber, glucose syrup, glucose syrup solids, honey, molasses, other commercially available concentrated polysaccharide ingredients, and mixtures thereof. A syrup or syrup solids can be used in whole or in part for a supplemental non-sucrose sweetener.

Figure 4A:
FIG. 4A shows an example of a coating method.

An exemplary dual slurry method is shown at FIG. 4A, and can include a step of applying non-sucrose slurry 60 onto base pieces 2, and a separate and (preferably) subsequent step of applying sucrose slurry 50 onto base pieces 2, over the applied layer of non-sucrose slurry 60. As shown at FIG. 4A, non-sucrose slurry 60 can be applied first, followed by application of sucrose slurry 50, without a drying step in-between. In alternate embodiments non-sucrose slurry 60 can be applied to base piece 2, followed by a drying step, then application of sucrose slurry 50 to the dried layer of non-sucrose slurry 60.

A sucrose slurry 50 and non-sucrose slurry 60 can contain moisture in an amount in a range from about 10 to about 35 weight percent, e.g., from about 10 to 28 weight percent, for application to the food product, which is mostly removed by drying to form dry coating 4, e.g., as shown at FIG. 2.

Figure 4B:
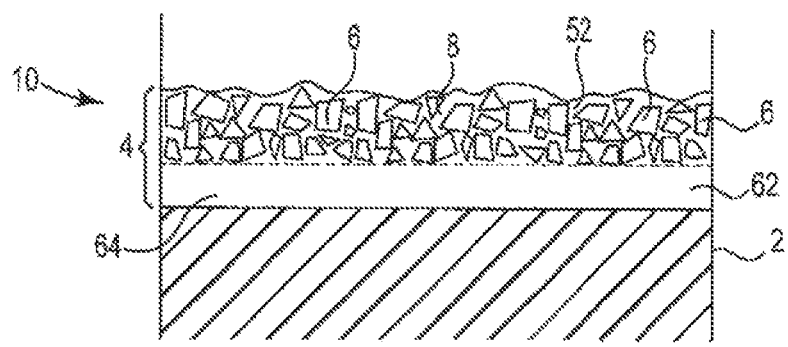
FIG. 4B shows an example of a coated food piece.

FIG. 4B illustrates an example of food piece 10 prepared according to an exemplary dual slurry method. Piece 10 includes dried coating 4 represented to include two layers of different coating materials applied in order: non-sucrose slurry 60 applied as lower coating 62, and sucrose slurry 50 applied and dried to form upper coating 52. Lower coating 62, the dried non-sucrose slurry, is an amorphous layer that contains non-sucrose soluble solids and other components of a non-sucrose slurry upon removal of water. Upper coating 52, the dried sucrose slurry, includes sucrose crystals 6 in an amorphous matrix 8, which may include non-sucrose soluble solids, insoluble solids, as well as some dissolved sucrose. These coated layers are represented as being separated by a dashed line to indicate a potential boundary and separation between the layers; the separation may be gradual, may be difficult to discern, or may be indiscernible in which case coating 4 may be represented as shown at FIG. 2. FIG. 4B shows food piece 10 after drying the coating materials (slurries 50 and 60) in an exemplary embodiment wherein two layers are potentially discernible (which is not a requirement of a coating as described herein.)

Combined "Sweet Oil" and "Dual Slurry" Coating Materials and Method

According to another embodiment of a method for preparing a coating as described, a coating can be formed on a food particle surface by methods that involve three separate coating materials: a sweet oil, a sucrose slurry, and a non-sucrose slurry. This described embodiment may sometimes be referred to as the "combined sweet oil and dual slurry" (or "combined") embodiment or method.

The "combined" method includes features similar to the "dual slurry" method in that the "combined" method also uses a sucrose slurry and a separate non-sucrose slurry to at least partially separate sucrose from non-sucrose soluble solids, placing major amounts of the sucrose and non-sucrose soluble solids separately into two different coating materials. According to the combined method (as with the dual slurry method) a substantial portion of the total amount of sucrose in the dried coating is included in the sucrose slurry, and a substantial portion of the total non-sucrose soluble solids of the dried coating is included in the non-sucrose slurry. Insoluble solids can be included in either slurry or may be apportioned between the sucrose slurry and the non-sucrose slurry.

Figure 5A:
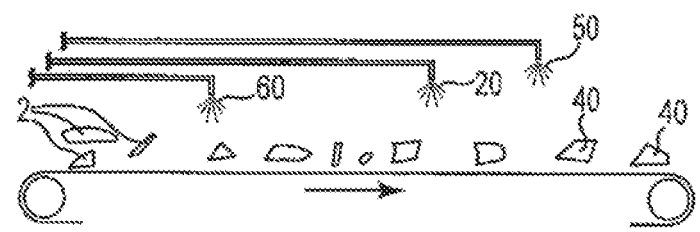
FIG. 5A shows an example of a coating method.

An exemplary "combined sweet oil and dual slurry" method (or "combined" method for short) is shown at FIG. 5A and can include a step of applying non-sucrose slurry 60 as a first coating material in the coating process, then (optionally and preferably without a drying step) applying sweet oil 20 (or alternately dry sucrose crystals) over the applied non-sucrose slurry 60, and then applying sucrose slurry 50 onto base pieces 2 previously coated with non-sucrose slurry 60 and sweet oil 20 (alternately dry sucrose crystals). An alternate embodiment (not illustrated) can include a first step of applying non-sucrose slurry 60 as a first coating material, then (optionally and preferably without a drying step) applying sucrose slurry 50 onto base pieces 2 previously coated with non-sucrose slurry 60, and lastly applying sweet oil 20 (or alternately a dry charge of crystalline sucrose) over the applied sucrose slurry 60. The coating materials can be applied in separate steps as shown at FIG. 5A with no intervening steps and with no drying step until after application of all three coating materials.

Figure 5B:
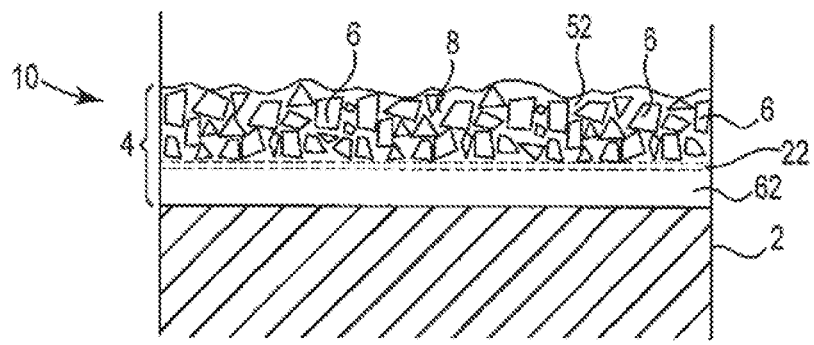
FIG. 5B shows an example of a coated food piece.

FIG. 5B illustrates an example of food piece 10 prepared according to a "combined" method, e.g., as illustrated at FIG. 5A. Piece 10 includes dried coating 4 (including desired sucrose crystallinity and sucrose ratio as described) represented to include three layers derived from the three applied coating materials: a dried layer 62 of non-sucrose slurry 60, sweet oil layer 22 from sweet oil coating material 20, and a dried layer 52 of sucrose slurry 50. Alternately, sweet oil layer 22 may be the exterior layer and dried layer 52 of sucrose slurry 50 may be the middle layer.

Dry Charge Method

According to an alternate exemplary method (e.g., the "dry charge" method), a dried sugar coating as described can be formed on a food piece by methods that involve a sugars slurry coating material and a sucrose particles (or sucrose crystals) dry charge coating material, each applied to the food piece. This described embodiment may sometimes be referred to as the "dry charge" embodiment or method, which is also described in Applicant's copending U.S. patent application Ser. No. 13/624,073, entitled "COATED FOOD PRODUCT AND METHODS," filed on even date herewith and being based on provisional patent application Ser. Nos. 61/537,354 and 61/537,375 both filed Sep. 21, 2011; the entirety of that copending U.S. patent application is incorporated herein by reference.

Figure 6A:
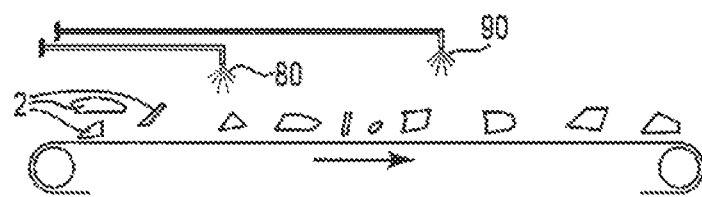
FIG. 6A shows an example of a coating method.

An exemplary method of preparing a dried coating using the dry charge method is shown at FIG. 6A. The method includes a step of applying a sugars slurry 80 to a surface of a food piece (e.g., base) 2 to form a sugars slurry-coated base. Subsequently, dry sucrose particles 90 can be applied to the sugars slurry-coated base. See FIG. 6A.

The sugars slurry can be as described herein, with particular embodiments containing from about 50 to about 80 weight percent sucrose, e.g., from about 70 to about 79 weight percent sucrose, on a dry basis. The sugars slurry also contains non-sucrose soluble solids (including non-sucrose sweetener, fiber, and optionally sodium chloride), optional insoluble solids (e.g., flavorant, oil, colorant), and optional water.

The sucrose particles can be powdered sucrose as described herein, e.g., having a mean particle size of 100 microns or less, e.g., 50 micron or less, e.g., from about 20 to about 35 microns, when measures using a "volume average" calculation, e.g., using a Microtrac particle size analyzer. The sucrose particles can be in the form of a dry (less than 0.5 weight percent moisture) powder composition.

Figure 6B:
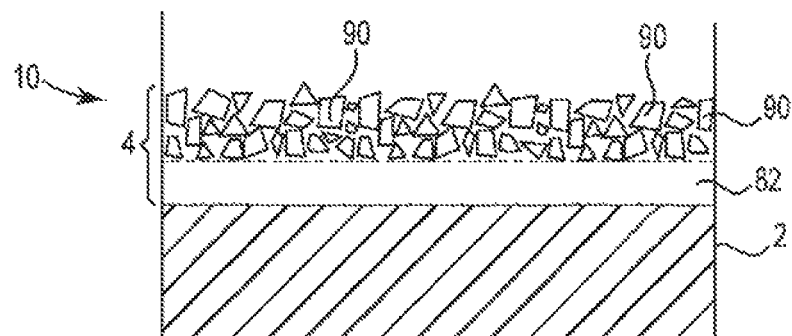
FIG. 6B shows an example of a coated food piece.
All drawings are not to scale.

FIG. 6B illustrates an example of food piece 10 prepared according to a dry charge method. Piece 10 includes dried coating 4 represented to include layer 82 of dried sugars slurry 82, and dried sucrose particles 90. Sugar crystals 90 are derived from the solid crystals applied by dry charging crystalline sucrose, and also from crystallization of dissolved sucrose present in sugars slurry; the crystals of the dry charge applied to the sugars slurry can act as seed particles or nucleation sites for the dissolved sucrose of sugars slurry 82, to grow crystals 90.

Prior to the presently described methods, coating materials, and coatings, RTE cereal products that include a pre-sweetener coating prepared from materials having high corn syrup (or alternate non-sucrose soluble solids) levels, such as above 15 or 20 weight percent of the dried coating, have typically or always exhibited undesirable blocking or clumping of the pre-sweetened product pieces in the cereal box upon storage, especially under humid conditions, leading to elevated levels of consumer complaints. Moreover, commercial production of such previous products can be adversely affected by the formation of clusters or clumps of products (cereal pieces) during manufacture, rather than a desired free flowing blend or stream of such coated pieces. Such undesired clusters of cereal pieces must be removed prior to packaging, leading to production losses. Also, these high corn syrup level compositions can be more difficult to dry because high levels of corn syrup impart increased hygroscopicity to such compositions, requiring extended drying times to form finished products sufficiently dry for shelf stable storage.

Coating materials and methods as described herein can be used to prepare sugar coatings that include reduced sucrose (as characterized by a relatively low sucrose ratio) and correspondingly higher levels of non-sucrose soluble solids, without causing some of the shortcomings that are expected when using higher levels of non-sucrose soluble solids. The described coating materials and methods can improve properties of a low sucrose coating by creating a coating that has increased sucrose crystallinity, even with lower total levels of sucrose. The improved coatings can be prepared by using any of the coating materials described herein, including one or more of a sweet oil, sugars slurry, sucrose slurry, or non-sucrose slurry, optionally by using coating methods such as those referred to as the sweet oil method, the dual slurry method, the combined method, and the dry charge method. A coating as described, exhibiting sucrose ratio and crystallinity as described, is useful and advantageous regardless of the manner by which the coating is formed or the coating materials used to prepare the dried coating. As such, methods and coating materials other than those specifically described herein will also be useful to prepare the coating.

Specifically with respect to the "sweet oil" coating method, use of the sweetened oil slurry (a sweet oil coating material) can alleviate problems associated with prior high corn syrup (or other non-sucrose soluble solids) levels. Still another benefit is in providing a potential reduction in the rate of drying and thus in drying times required.

In some embodiments, a coating material such as the sugars slurry or non-sucrose slurry can include high conversion maltodextrin or low conversion syrups having a dextrose equivalent ("DE") ranging from about 5 to less than 43, such as about 5 to about 42 to insure that the level of sugars (mono- and disaccharides) is low. In contrast, conventional 63 DE corn syrups, high maltose corn syrup, and high fructose corn syrups (having DE ranging from about 52-97), and pure sugars such as sucrose, fructose, dextrose, glucose, lactose have a DP or one or two. For example, 63 DE corn syrup has a sugar content of 66% (db), 42 DE corn syrup has a sugar content of 35% (db), 36 DE corn syrup has a sugar content of 25% (db), and 26 DE corn syrup has a sugar content of 15% (db). Alternately, non fractionated corn syrups can be used in a sugars slurry or a non-sucrose slurry. (Non fractionated corn syrups can have up to 35% (db) by weight of constituents having a D.P of 1-2. While less pure, such materials are much less expensive than pure fractionated syrups.). Maltodextrin can be used in combination with a sweetened oil slurry (sweet oil), as described herein, to obtain advantages as described.

A described coating material, e.g., a low sucrose sugar syrup (an example of a sugars slurry), a non-sucrose slurry, or a sucrose slurry, can include additional non-sucrose soluble solids that are non-sweetener ingredients, e.g., soluble fiber. Soluble fiber can include, for example, soluble corn fiber, polydextrose, hydrolyzed guar gum, inulin (or other oligosaccharides especially frusto-oligosaccharides), and mixtures thereof. In some low sucrose syrups (sugar slurries), some of the second supplemental soluble saccharide component can also be replaced with other soluble ingredients such as soluble fiber. In another embodiment, a coating material (sugars slurry or non-sucrose slurry) can include a soluble fiber such as inulin, polydextrose, or mixtures thereof. A good description of the use of such soluble fiber ingredients in coatings for RTE cereals can be found in U.S. Pat. No. 6,149,965 "Cereal Products with Inulin and Methods of Preparation" issued Nov. 21, 2000 to Van Lengerich et al. The present reduced sugar compositions (dried coating, sugars slurry, or non-sucrose slurry) can include 0.1% to ~40% by weight, preferably ~1-20%, or ~5% of soluble fiber.

As used herein the term "oligosaccharides" describes a molecule containing three to twenty sugar units joined by glycosidic bonds. The soluble fiber inulin is an example of an oligosaccharide useful herein as a supplemental soluble sugar which may be provided as part of a coating material. Soluble "oligosaccharides" can be used in a coating material, e.g., in full or partial substitution for the supplemental or secondary sugars. If used, an oligosaccharide can be present in a range from about 0.1% to about 15% of a dried coating, a non-sucrose slurry, or a sugars slurry, e.g., a low sucrose sugar syrup, on a dry basis.

In one variation, the present coating materials can be free of (i.e., contain 0.5 weight percent or less on a dry basis) any ingredient from the family of bulk sweeteners known as polyols or sugar alcohols such as sorbitol, xylitol, lactitol, erythritol, and/or maltitol.

A coating or a coating material (e.g., sugars slurry (e.g., reduced sucrose sugars slurry), sucrose slurry, or non-sucrose slurry) can additionally include insoluble bulking ingredient (a form of insoluble solid). The insoluble solids bulking ingredient can be included in a range from about 0.5% to 20%, preferably about 1% to 12% of the dried coating by weight on a dry basis, or in a similar range in a sugars slurry (e.g., reduced-sucrose sugar syrup). Any insoluble component such as a fortifying ingredient (e.g.

calcium carbonate or a calcium phosphate salt for calcium fortification) can be added in the form of a fine powder having a particle size such that 90 percent has a particle size of less than 50 micron, preferably 40 um or less in size and for best results under 10 microns. Use of such calcium bulking ingredients also provides a secondary advantage of calcium fortification.

Useful herein are calcium ingredients that supply at least 20 percent of their weight in elemental calcium. Preferred for use herein are calcium ingredients selected from the group consisting of food grade calcium carbonate, ground limestone, calcium phosphate salts and mixtures thereof. Such calcium phosphate salts provide high levels of calcium and are relatively inexpensive. Moreover, such calcium phosphate salts can be used to provide calcium at high fortification levels with an acceptable taste. Calcium phosphate is generally available as a monobasic ($CaH_4(PO4)_2 \cdot H_2O$), dibasic ($CaHPO_4 \cdot 2H_2O$) or tribasic ($Ca_3(PO_4)_2$) salts. Preferred for use herein is tricalcium phosphate, $Ca_3(PO_4)_2$, ("TCP") because of its high weight percentage of calcium (about 38%). Such added calcium ingredients can collectively comprise about 0.1-10%, preferably about 5%-10% of the coating formulation, most preferably about 5-7.

A dried coating as described can optionally include a supplemental high potency sweetener to provide for supplemental sweetness. High potency sweeteners include both natural and synthesized materials. Some specific examples include aspartame, potassium acetylsulfame, sucralose, alitame, neotame, saccharin, cyclamates, thaumatin, trehalose, tagatose. In yet another embodiment, the coating can include supplemental high potency "natural" or plant sweeteners such as stevia, stevia extracts, lo han fruit extracts, and rubusoside. Lo Han fruit extract (a.k.a. lo han kuo, lo han quo, arhat fruit, monks fruit) is derived from the fruit of the plant *Siraitia grosvenorii*. Another high potency natural sweetener, rubusoside, can be extracted from the leaves of *Rubus suavissimus* (Chinese blackberry).

Optionally, a dried coating or coating material can include added vitamins, minerals, and other adjuvant ingredients. Suitable adjuvant ingredients further include colors, calcium, preservatives. If present, such ingredients may comprise ~0-2% of the coating on a dry basis.

The coating can be applied in a weight ratio of base to coating (dry weight basis) of from about 10:1 to 1:1 depending upon the particular end use application and amount of coating desired. In preferred variations, the weight ratio of base to coating can range from about 10:2 to 10:5.

In a preferred embodiment, the slurry coating (sugars slurry) can be applied in the form of a hot, reduced-sucrose sugars slurry, the slurry being at a temperature of ~93-149° C., e.g., from ~95-127° C., more preferably ~110-121° C.

The coating materials, after application, can be dried by standard methods to remove moisture from the coating materials and to form a dried coating. The drying step can be practiced, for example, using forced dry hot air having a temperature of ~90-150° C. (e.g., ~90-150° C.) for ~5-15 minutes. In preferred form, the finished dried cereal product has a final moisture content of ~1-5%, preferably ~2-3% and is in the form of a loose mixture of free flowing individual coated pieces.

The crystallinity of sucrose in the dried coating can be measured and calculated using conventional and well know techniques such as Differential Scanning calorimetry ("DSC"). (See for example, "Non-Isothermal and Isothermal Crystallization of Sucrose from the Amorphous State" by Saleki-Gerhardt, Azita and Zografi, George, Pharmaceutical Research, Cover Date: 1994Aug. 1, Publisher: Springer Netherlands, Issn: 0724-8741, pages 1166-1173, Volume: 11, Issue: 8, Url: http://dx.doi.org/10.1023/A:1018945117471, Doi: 10.1023/A:1018945117471.)

Reference is now made to FIG. 1. FIG. 1 is a graph that includes an X axis showing a sucrose ratio of total weight sucrose per total weigh soluble solids (including sucrose and non-sucrose soluble solids, not including the weight of any insoluble solids). The Y axis scales to the percentage (expressed in decimal form) of sucrose in the coating that is in crystalline form as measured by DSC. A number of commercially available pre-sweetened breakfast cereals including various levels of constituents in the pre-sweetener coating were selected and analyzed for sucrose crystallinity and sucrose ratio of a sugar coating. The data points for such competitive analysis are indicated by the white unfilled diamonds in FIG. 1. These representative breakfast cereal products include:

| PRODUCT | sugar g/serving | Serving Size (g) | Total Sugars Label (%) | Estimated S/SS (sucrose ratio) | % Crystallinity of Sucrose |
|---|---|---|---|---|---|
| Special K | 4 | 31 | 12.90 | 0.84 | 0 |
| Crunch 'n Munch Popcorn | 11 | 31 | 35.48 | 0.47 | 0.04 |
| Cinnamon Corn Flakes | 6 | 32 | 18.75 | 0.72 | 0.05 |
| Golden Crisp | 14 | 27 | 51.85 | 0.90 | 0.07 |
| Corn Pops | 10 | 32 | 31.25 | 0.94 | 0.16 |
| Cracklin Oat Bran | 15 | 49 | 30.61 | 0.86 | 0.18 |
| Cinnamon Toast Crunch | 10 | 31 | 32.26 | 0.80 | 0.27 |
| Honey Smacks | 15 | 27 | 55.56 | 0.82 | 0.28 |
| Crunchy Nut | 10 | 27 | 37.04 | 0.94 | 0.33 |
| Cocoa Puffs | 11 | 27 | 40.74 | 0.90 | 0.33 |
| Reese's Puffs | 11 | 29 | 37.93 | 0.73 | 0.43 |
| Smart Start | 14 | 50 | 28.00 | 0.87 | 0.44 |
| Life | 6 | 32 | 18.75 | 0.96 | 0.44 |
| Chocolate Chex | 8 | 32 | 25.00 | 0.74 | 0.45 |
| Oh's | 12 | 27 | 44.44 | 0.96 | 0.53 |
| Cap'n Crunch | 12 | 27 | 44.44 | 0.99 | 0.55 |
| Chocolate Cheerios | 9 | 27 | 33.33 | 0.92 | 0.59 |
| Cinnabon | 12 | 30 | 40.00 | 0.92 | 0.61 |
| Frosted Flakes | 11 | 30 | 36.67 | 0.94 | 0.65 |
| Honey Bunches of Oats | 6 | 30 | 20.00 | 0.94 | 0.73 |
| Froot Loops | 12 | 29 | 41.38 | 0.98 | 0.75 |
| Honey Comb | 10 | 32 | 31.25 | 0.94 | 0.82 |
| Honey Nut Cheerios Control | 9 | 28 | 32.14 | 0.89 | 0.84 |
| Wheatfuls | 11 | 55 | 20.00 | 0.99 | 0.85 |
| Frosted Mini Wheats | 12 | 59 | 20.34 | 0.97 | 0.94 |

Several coatings as described in the present description were prepared and similarly analyzed for sucrose crystallinity and sucrose ratio. The results of such testing are depicted on the graph of FIG. 1 by the symbols above curved dotted line 10; filled circles represent coatings made by the sweet oil method; filled triangles represent coatings made by the dry charge method; boxes containing an "x" represent coatings made by the dual slurry method; and open circles represent coatings made by the combined dual slurry and sweet oil method.

As shown at FIG. 1, the results of such testing indicate that the products of the present invention exhibited surprisingly greater levels of sucrose crystallinity in the pre-sweetener coating even at low levels of sucrose (low sucrose ratio) compared to all of the measured products of the prior art.

In FIG. 1, it can be seen that the graph includes curved line 10. In a product embodiment, the present invention resides in all coated products, especially breakfast cereal products, having a sucrose based coating comprising non-sucrose soluble solids that have a combination of sucrose crystallinity value of the sucrose ("y") in the coating and a sucrose to soluble solids ratio value ("x") that reside in the area above curved dotted line 10 ($y=2.28x^2-1.19x+0.28$). In a more specific embodiment, the present invention resides in all coated products especially breakfast cereal products having a sucrose based coating comprising non-sucrose soluble solids that have a combination of sucrose crystallinity value of the sucrose in the coating, and a sucrose to soluble solids ratio value that reside in the area above line 10 extending from line segment 12 to line segment 14; i.e., having a sucrose crystallinity value of at least 0.20 at a sucrose-to-soluble solids ratio of 0.45 (defining a point 12 on line 10) to 1.0 sucrose crystallinity value at a sucrose-to-soluble solids ratio of 0.85 (defining a point 14 on line 10).

The above description is intended to be illustrative and not restrictive. For example, the above-described embodiments and variations can be used in combination with each other. Many other embodiments will be apparent to those of skill in the art upon reviewing the above description. The scope of the invention should, therefore, be determined with reference to the appended claims, along with the full scope of equivalents to which such claims are entitled. While the invention has been described in connection with what is presently considered to be useful embodiments, it is to be understood that the invention is not to be limited to the disclosed embodiment, but on the contrary is intended to cover various modifications and equivalent arrangements included within the spirit and scope of the appended claims.

The invention claimed is:

1. A method for preparing a pre-sweetened comestible comprising a base and a dried coating, the method comprising:
   providing a base, and
   forming a dried coating on the base by:
      applying sweet oil to the base, the sweet oil comprising oil and sucrose,
      the sucrose being at least partially crystalline, and
         applying a separate sugars slurry, that is different from the sweet oil, to the base, the sugars slurry comprising sucrose, and non-sucrose soluble solids, and water,
         wherein the sweet oil comprises powdered sugar and the sweet oil is applied to the base to provide powdered sugar in a range from about 0.01 to 5 weight percent (dry basis) of the weight of the base and coating.

2. A method according to claim 1 comprising first applying the sweet oil, and subsequently applying the sugars slurry.

3. A method according to claim 1 comprising first applying the sugars slurry, and subsequently applying the sweet oil.

4. A method according to claim 1 comprising simultaneously applying a stream of the sugars slurry and a separate stream of the sweet oil.

5. A method according to claim 1 wherein the sweet oil comprises: from about 20 to about 50 weight percent sucrose and from about 50 to about 80 weight percent oil on a dry basis.

6. A method according to claim 1 wherein the sweet oil comprises sucrose particles having an average particle size (volume average) of 100 microns or less.

7. A method according to claim 1 comprising drying the coating to a dried coating, wherein the percent crystallinity of sucrose in the dried coating is a value y or greater calculated according to the formula:

$$\text{crystallinity}(y)\text{percent} \geq 2.28x^2 - 1.19x + 0.28$$

wherein x is a ratio of weight sucrose per total weight soluble solids in the coating.

8. A method according to claim 1 wherein the sugars slurry includes 80% or less sucrose (dry wt. basis) and 15-20% non-sucrose soluble solids (dry wt. basis).

9. A method according to claim 8 wherein the sugars slurry is applied at a temperature of about 200 to 250° F.

10. A method according to claim 8 wherein the sugars slurry further includes about 5 to 12% insoluble solids (dry wt. basis).

11. A method for preparing a pre-sweetened comestible comprising a base and a dried coating, the method comprising:
   providing a base, and
   forming a dried coating on the base by:
      applying sweet oil to the base, the sweet oil comprising oil and sucrose, with the sweet oil including from about 5 to about 66 weight percent sucrose, and from about 34 to about 95 weight percent oil on a dry basis, the sucrose being at least partially crystalline, and
      applying a separate sugars slurry to the base, the sugars slurry comprising sucrose, and non-sucrose soluble solids, and water,
      wherein the sweet oil comprises powdered sugar and the sweet oil is applied to the base to provide powdered sugar in a range from about 0.01 to 5 weight percent (dry basis) of the weight of the base and coating.

12. A method for preparing a pre-sweetened comestible comprising a base and a dried coating, the method comprising:
   providing a base, and
   forming a dried coating on the base by:
      applying sweet oil to the base, the sweet oil comprising oil and sucrose, the sucrose being at least partially crystalline, and
      applying a separate sugars slurry to the base, the sugars slurry comprising sucrose, and non-sucrose soluble solids, and water,
      wherein the sweet oil comprises powdered sugar and the sweet oil is applied to the base to provide powdered sugar in a range from about 0.01 to 5 weight percent (dry basis) of the weight of the base and coating;
      wherein the sugars slurry includes 80% or less sucrose (dry wt. basis) and 15-20% non-sucrose soluble solids (dry wt. basis); and
      wherein the non-sucrose soluble solids include high conversion maltodextrin or low conversion syrups having a dextrose equivalent ranging from about 5 to 42.

* * * * *